US011382260B2

(12) United States Patent
Tewari et al.

(10) Patent No.: US 11,382,260 B2
(45) Date of Patent: Jul. 12, 2022

(54) ESTIMATION OF CROP TYPE AND/OR SOWING DATE

(71) Applicant: International Business Machines Corporation, Armonk, NY (US)

(72) Inventors: Mukul Tewari, Lafayette, CO (US); Jitendra Singh, Noida (IN); Kuntal Dey, Vasant Kunj (IN)

(73) Assignee: International Business Machines Corporation, Armonk, NY (US)

( * ) Notice: Subject to any disclaimer, the term of this patent is extended or adjusted under 35 U.S.C. 154(b) by 292 days.

(21) Appl. No.: 16/780,833

(22) Filed: Feb. 3, 2020

(65) Prior Publication Data

US 2021/0235612 A1  Aug. 5, 2021

(51) Int. Cl.
*A01C 14/00* (2006.01)
*G06Q 50/02* (2012.01)
(Continued)

(52) U.S. Cl.
CPC ............. *A01C 14/00* (2013.01); *G06Q 50/02* (2013.01); *G06V 20/188* (2022.01);
(Continued)

(58) Field of Classification Search
CPC ...... A01C 14/00; G06Q 50/02; G06V 20/188; G06V 20/68; B64C 39/024;
(Continued)

(56) References Cited

U.S. PATENT DOCUMENTS 9,756,773 B1 *  9/2017  Barbosa ............... A01C 21/007
10,958,828 B2 *  3/2021  Stelmar Netto ..... G06V 20/188
(Continued)

FOREIGN PATENT DOCUMENTS

CN  106097131 A  11/2016
CN  107808249 A  3/2018
(Continued)

OTHER PUBLICATIONS

ISR/WO (International Search Report/Written Opinion) in International Application No. PCT/IB2021/050580 dated Apr. 26, 2021.
(Continued)

*Primary Examiner* — Jerome Grant, II
(74) *Attorney, Agent, or Firm* — Lily Neff

(57) ABSTRACT

Method, apparatus, and computer program product are provided for estimating crop type and/or sowing date. In some embodiments, a historical crop growth time series and a plurality of simulated crop growth time series are determined, and the historical time series is matched against each simulated time series to determine an estimated crop type and/or sowing date. For example, one simulated time series may be determined for each crop type/sowing date combination within a set of one or more crop types and one or more sowing dates based on historical crop data. Each time series represents crop growth in an area of interest and comprises element(s) including crop-specific parameter(s), such as leaf area index (LAI). The historical time series may be determined based on remote sensor data. Each simulated time series may be determined using a crop growth simulation model and based on historical crop data, geospatial data, and weather data.

19 Claims, 11 Drawing Sheets

(51) Int. Cl.
*G06V 20/10* (2022.01)
*B64G 1/10* (2006.01)
*B64C 39/02* (2006.01)
*G06V 20/68* (2022.01)

(52) U.S. Cl.
CPC ...... *B64C 39/024* (2013.01); *B64C 2201/123* (2013.01); *B64G 1/1021* (2013.01); *B64G 2001/1028* (2013.01); *G06V 20/68* (2022.01)

(58) Field of Classification Search
CPC ............ B64C 2201/123; B64G 1/1021; B64G 2001/1028; Y02A 40/28
USPC .......................................................... 382/110
See application file for complete search history.

(56) References Cited

U.S. PATENT DOCUMENTS

| | | | | |
|---|---|---|---|---|
| 11,257,172 | B2* | 2/2022 | Bender | G06Q 50/02 |
| 2009/0113570 | A1* | 4/2009 | Taramino | C07K 14/415 |
| | | | | 800/260 |
| 2012/0109387 | A1* | 5/2012 | Martin | G05B 19/042 |
| | | | | 700/284 |
| 2012/0290140 | A1 | 11/2012 | Groeneveld | |
| 2016/0003790 | A1 | 1/2016 | Osborne et al. | |
| 2016/0063420 | A1* | 3/2016 | Tomii | G06Q 10/06314 |
| | | | | 705/7.24 |
| 2018/0146626 | A1* | 5/2018 | Xu | A01G 25/165 |
| 2018/0181893 | A1 | 6/2018 | Basso | |
| 2018/0189564 | A1 | 7/2018 | Freitag et al. | |
| 2019/0350140 | A1* | 11/2019 | Werner | A01G 7/04 |
| 2020/0008431 | A1* | 1/2020 | Mitter | A01N 63/30 |

FOREIGN PATENT DOCUMENTS

| | | |
|---|---|---|
| CN | 108805384 A | 11/2018 |
| CN | 109165352 A | 1/2019 |
| JP | 2003006274 A | 1/2013 |
| WO | 2019032648 A1 | 2/2019 |
| WO | 2021156706 A1 | 8/2021 |

OTHER PUBLICATIONS

Singh et al., "Crop-Identification Using Sentinel-1 and Sentinel-2 Data for Indian Region", 2018 IEEE International Geoscience and Remote Sensing Symposium (IGARSS 2018), Valencia, Jul. 2018, pp. 5312-5314.

Blaes et al., "Efficiency of crop identification based on optical and SAR image time series", Remote Sensing of Environment, vol. 96, Mar. 5, 2005, pp. 352-365.

Unknown, "Modular Approach", 14 pages, printed from <https://dssat.net/models-and-applications/modular-approach-example> on Aug. 9, 2019.

Ban et al., "Assimilating MODIS data-derived minimum input data set and water stress factors into CERES-Maize model improves regional corn yield predictions", PLoS ONE, vol. 614, Issue 12, e0211874, Feb. 25, 2019, pp. 1-21.

Kasampalis et al., "Contribution of Remote Sensing on Crop Models: A Review", Journal of Imaging, vol. 4, No. 52, Mar. 23, 2018, pp. 1-19.

Unknown, "Field Crops: Usual Planting and Harvesting Dates", United States Department of Agriculture, National Agricultural Statistics Service, Agricultural Handbook No. 628, Oct. 2010, 51 pages.

Mell et al., "The NIST Definition of Cloud Computing", National Institute of Standards and Technology, NIST Special Publication 800-145, Sep. 2011, 7 pages.

* cited by examiner

ESTIMATION OF CROP TYPE AND/OR SOWING DATE

BACKGROUND

The present invention relates in general to the field of crop monitoring. More particularly, the present invention relates to providing early estimation of crop type and/or sowing date.

SUMMARY

Embodiments of the present disclosure include a method, apparatus, and computer program product for estimating crop type and/or sowing date. In some embodiments, a historical crop growth time series and a plurality of simulated crop growth time series are determined, and the historical crop growth time series is matched against each of the plurality of simulated crop growth time series to determine an estimated crop type and/or sowing date. For example, a simulated crop growth time series may be determined for each crop type/sowing date combination within a set of one or more crop types and one or more sowing dates based on historical crop data. Each time series (i.e., the historical crop growth time series and each simulated crop growth time series) is representative of crop growth in an area of interest and comprises one or more elements including one or more crop-specific parameters, such as leaf area index (LAI), normalized difference vegetation index (NDVI), and the like. The historical crop growth time series may be determined based on remote sensor data, such as a time series of image data of the area of interest. Each simulated time series may be determined using a crop growth simulation model and based on historical crop data, geospatial data, and weather data. The historical crop data may include, for example, crop types historically grown in a crop growth region associated with the area of interest during at least one previous crop cycle and a sowing calendar for each of those crop types. The geospatial data may include, for example, agricultural information characterizing the area of interest. The weather data may include, for example, a weather time series representative of one or more weather conditions in a weather region associated with the area of interest.

BRIEF DESCRIPTION OF THE SEVERAL VIEWS OF THE DRAWINGS

Embodiments will hereinafter be described in conjunction with the appended drawings, where like designations denote like elements.

DETAILED DESCRIPTION

Figure 1:
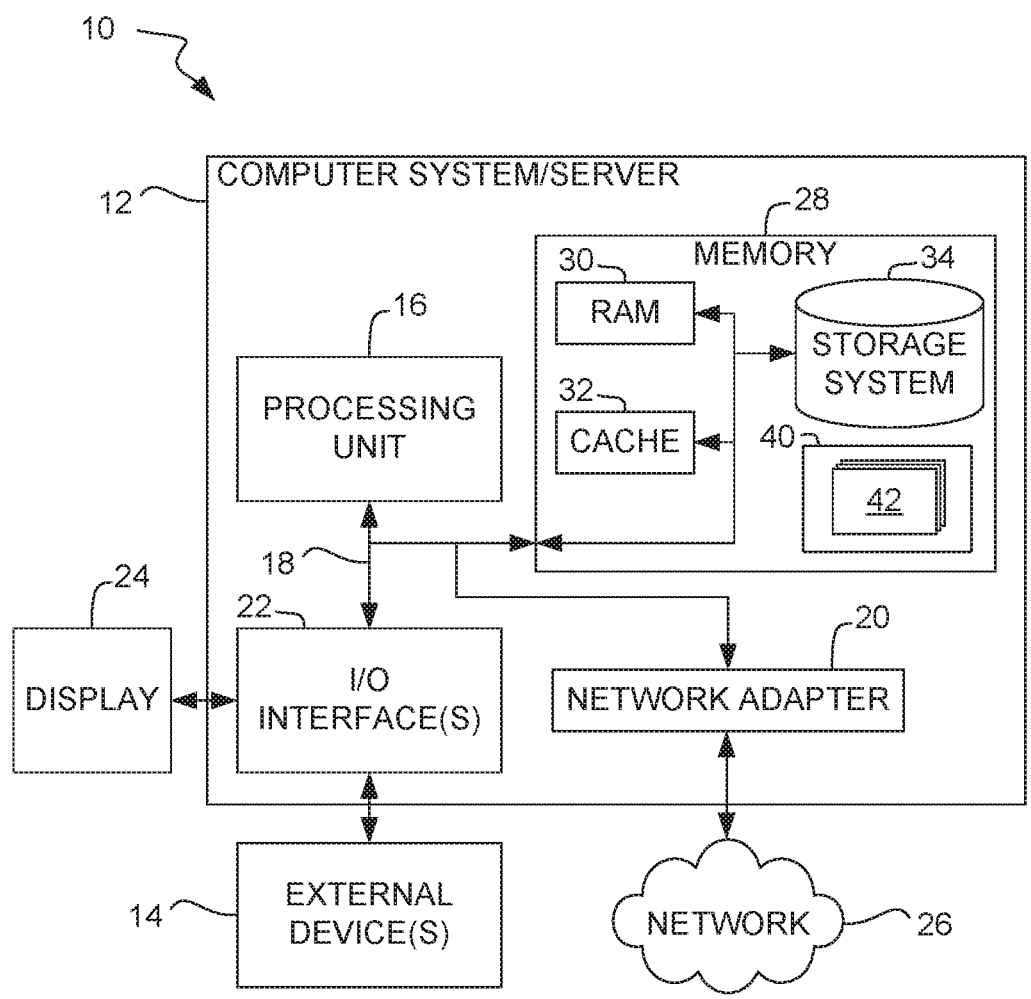
FIG. 1 depicts a cloud computing node, according to one or more embodiments.

Crop monitoring is utilized extensively by agribusiness, as well as by government. For example, agribusinesses such as commodity trading, seed supply, pesticide manufacturing, and logistic services use crop monitoring in various aspects of their businesses. Crop monitoring also finds use in many governmental functions, including policy management.

Crop monitoring exists in myriad forms. Satellite crop monitoring, for example, facilitates real-time crop vegetation index monitoring of an area of interest (e.g., one or more fields) through the use of spectral analysis of high resolution satellite imagery. Crop monitoring is often utilized to answer questions related to crop development, such as "What is the sowing status during the on-going crop season (i.e., how much area has undergone sowing already)?" and "What amount of crop acreage is under different crops?". Such questions often boil down to providing, for an area of interest, estimation of crop type and/or sowing date.

The reliable estimation of crop type and/or sowing date, especially if available at an early stage can be of immense value. For example, early availability of this information can provide a competitive advantage to companies that use it (e.g., in applications such as crop insurance, commodity trading, seed supply, pesticide manufacturing, logistic services, etc.).

Estimations of crop type and/or sowing date are conventionally accomplished using remote sensing and ground surveys, typically available after several weeks of sowing. Improving this latency (e.g., by even one week or less), in accordance with some embodiments, potentially results in significant business value to all parties (i.e., users of such information, as well its providers).

Ground surveys have a number of disadvantages, such as high cost, high latency, low accuracy, limited coverage area, and non-scalability. Such disadvantages make the use of ground surveys impractical in terms of cost and efforts for early estimation of crop type and/or sowing date.

Remote sensing has a number of advantages, including low cost, medium latency, good accuracy, and extensive coverage. However, conventional approaches to estimating crop type and/or sowing date using remote sensing are effective only after several weeks of crop growth.

Crop growth simulation models are typically used as decision support systems (e.g., estimating the optimum point in time to apply fertilizer) and to provide "estimation of yield" maps. As a byproduct, crop growth simulation models can provide comprehensive information on crop health progression on a periodic basis (e.g., daily or even more often).

In accordance with some embodiments, a method, apparatus, and computer program product for estimating crop type and/or sowing date benefits from joint use of one or more crop growth simulation models and remote sensing. Moreover, using a crop growth simulation model in conjunction with remote sensing to provide early estimation of crop type and/or sowing date, in accordance with some embodiments, can facilitate the determination of derivative information, such as sowing patterns and acreage under multiple crop types at a very early stage in the crop cycle.

As used herein, the term "crop type" may include the type of crop planted and the variety, or cultivar, of that type of crop.

In accordance with some embodiments, a historical crop growth time series and a plurality of simulated crop growth time series are determined, and the historical crop growth time series is matched against each of the plurality of simulated crop growth time series to determine an estimated crop type and/or sowing date. For example, a simulated crop growth time series may be determined for each crop type/sowing date combination within a set of one or more crop types and one or more sowing dates based on historical crop data. As used herein, the term "crop type/sowing date combination" refers to a single crop type and a single sowing date selected from within a set of one or more crop types and one or more sowing dates. Each time series (i.e., the historical crop growth time series and each simulated crop growth time series) is representative of crop growth in the area of interest and comprises one or more elements including one or more crop-specific parameters, such as leaf area index (LAI), normalized difference vegetation index (NDVI), fraction of absorbed photosynthetically active radiation (fAPAR), and the like. The historical crop growth time series may be determined based on remote sensor data, such as a time series of image data of the area interest. Each simulated time series may be determined using a crop growth simulation model and based on historical crop data, geospatial data, and weather data.

As noted above, the historical crop growth time series may be determined based on remote sensor data, such as a time series of high spatial resolution image data of the area interest. Remote sensor data may include, for example, a time series of high spatial resolution image data of the area of interest captured by one or more satellites, one or more aerial drones, and/or one or more aircraft during previous and/or current crop cycles. For example, the remotely-sensed imagery data may be periodically (e.g., daily) captured from orbiting satellites and may provide details at a field level resolution. The image data may include, but are not limited to, optical, synthetic aperture radar (SAR), and advanced synthetic aperture radar (ASAR) image data. In the case of optical images, cloud cover may prevent or delay image acquisition in certain locations. SAR imagery, on the other hand, is able to guarantee a temporal frequency of images throughout the growing cycle because of its inherent ability to observe the Earth's surface independently of cloud cover.

Optical images may be obtained from, for example, European Space Agency (ESA) Sentinel-2, NASA/U.S. Geological Survey LANDSAT (Land Remote-Sensing Satellite"), SPOT (French: "Satellite Pour l'Observation de la Terre," or "Satellite for observation of Earth"), etc. For example, the optical images may include a set of N Sentinel-2 optical images acquired periodically (e.g., daily) in the current crop cycle from the start of the sowing calendar to the current date. In another example, the optical images may include a set of N LANDSAT optical images (e.g., ETM+ ("Enhanced Thematic Mapper Plus")) acquired periodically (e.g., daily) in the current crop cycle from the start of the sowing calendar to the current date. In yet another example, the optical images may include a set of N SPOT optical images (e.g., HRV ("High Resolution Visible") and XS ("Multispectral")) acquired periodically (e.g., daily) in the current crop cycle from the start of the sowing calendar to the current date.

SAR images may be obtained from, for example, European Space Agency (ESA) Sentinel-1, ESA ERS ("European Remote-Sensing Satellite"), Canadian Space Agency (CSA) RADARSAT ("Radar Satellite"), etc. For example, the SAR images may include a set of N Sentinel-1A VV/VH polarization SAR images (Interferometric Wide Swath, Ground Range Detected) acquired periodically in the current crop cycle from the start of the sowing calendar to the current date. In another example, the SAR images may include a set of NERS SAR images (e.g., PRI ("Pulse Repetition Interval (PRI)-format")) acquired periodically (e.g., daily) in the current crop cycle from the start of the sowing calendar to the current date. In yet another example, the SAR images may include a set of NRADARSAT SAR images (e.g., SGF ("SAR Georeferenced Fine (SGF)-format")) acquired periodically (e.g., daily) in the current crop cycle from the start of the sowing calendar to the current date.

ASAR images may be obtained from, for example, from European Space Agency (ESA) ENVISAT ("Environmental Satellite").

In some embodiments, remote sensor data from a single type of remote sensor (e.g., optical) may be used to determine the historical crop growth time series. For example, the historical crop growth time series may include a time series with one or more optical-derived crop-specific parameters (e.g., NDVI, LAI, etc.) determined based on optical image data. In accordance with one or more embodiments, the historical crop growth time series may include a NDVI time series determined based on Sentinal-2 optical images. For example, the NDVI values of the NDVI time series may be computed using reflectance values in the visible and near-infrared (NIR) bands (e.g., from band 4 (red) and band 8 (NIR) reflectance values) according to the following equation:

$$NDVI=(NIR-red)/(NIR+red) \quad (1)$$

where NIR and red represent the reflectance of near-infrared and red band spectra, respectively. During crop growth, the NDVI value increases as the density of green leaves increases because green leaves absorb visible light and reflect NIR light. Differences in crop growth rates for different crop types result in crop-specific differences in NDVI value changes over the crop cycle. Hence, a NDVI time series over the life cycle of a crop can be used as that crop's signature in identifying crop type, as well as that crop's sowing date.

In accordance with one or more embodiments, the historical crop growth time series may include a LAI time series determined based on a Sentinal-2 optical images. For example, the LAI values of the LAI time series may be computed according to the following equations:

$$LAI=(NDVI-0.28)/0.18, NDVI \leq 0.7 \quad (2)$$

$$LAI=(SR-1.0)/0.35, NDVI>0.7 \quad (3)$$

where NDVI and SR represent the normalized difference vegetation index and simple ratio, respectively, NDVI is computed according to Equation (1), above, and SR is calculated as follows:

$$SR = NIR/red \qquad (4)$$

where NIR and red represent the reflectance of near-infrared and red band spectra, respectively. Equations (1)-(4), above, are well known in the art. See, for example, BAN et al., "Assimilating MODIS data-derived minimum input data set and water stress factors into CERES-Maize model improves regional corn yield predictions," PLOS ONE, 21 pages, Feb. 25, 2019. LAI, which represents the surface area of leaves available for exchange of energy between the plant and the atmosphere, is an important variable when used to model evapotranspiration, biomass production, and yield.

In some embodiments, remote sensor data from two or more types of remote sensors (e.g., optical and SAR) may be used to determine the historical crop growth time series. For example, the historical crop growth time series may include a time series with one or more optical-derived crop-specific parameters (e.g., NDVI, LAI, etc.) determined based on optical image data and one or more SAR-derived crop-specific parameters (e.g., VV/VH polarization ratio) determined based on SAR image data. In accordance with one or more embodiments, the historical crop growth time series may include a time series with both optical-derived and SAR-derived crop-specific parameters respectively determined based on Sentinal-2 optical images and Sentinal-1 SAR images. Examples of suitable crop-specific parameters that may be derived from SAR images include, but are not limited to, VV/VH polarization ratio, local moments, and Haralik textures. The differences in the structure of crop plants, density of leaves, and field soil characteristics over the life cycle of a crop can lead to differences in the intensity of backscattered microwave signals. Thus, the course of the intensity of backscattered microwave signals in different polarizations or a combination of polarizations (e.g., VV/VH polarization ratio) over the life cycle of a crop can also be used as that crop's signature in identifying crop type, as well as that crop's sowing date.

The optical image data may be pre-processed using suitable conventional techniques. For example, the optical image data may be processed using the sen2cor toolbox to level 2A (i.e., surface reflection values with masks for clouds, cloud shadows, snow, and water) at a spatial resolution of 20 m. One skilled in the art will appreciate that other conventional techniques may be used to pre-process the optical image data set. For example, differing spatial resolutions may be rectified to the same resolution using, for example, the nearest neighbor resampling technique.

The SAR image data set may be pre-processed using suitable conventional techniques. For example, the SAR image data set may be processed using the Sentinel Application Platform (SNAP) toolbox by performing the following operations—(A) calibrate the data set to obtain the backscatter coefficient, (B) multi-look the data set with a window size of 2×2 pixels to reduce the speckle noise effect reaching a spatial resolution of 20 m, (C) remove the topographical effect in the data set by using a digital elevation model (DEM) (e.g., from the Shuttle Radar Topography Mission) to derive terrain slopes and corresponding orientation, and (D) apply a simple Lee filter with window size of 3×3 pixels to further reduce the speckle noise effect while preserving the 20 m spatial resolution. Other conventional techniques may be used to pre-process the SAR image data set. For example, differing spatial resolutions may be rectified to the same resolution using, for example, the nearest neighbor resampling technique.

In some embodiments, the remote sensor data may be provided by one or more remote sensor databases (e.g., 426 in FIG. 4, 926 in FIG. 9) or a geospatial data platform, such as IBM® PAIRS (Physical Analytics Integrated Data Repository and Services)—Geoscope. IBM® is a registered trademark of International Business Machines Corporation ("IBM") in the United States. IBM® PAIRS—Geoscope is a platform, specifically designed for massive geospatial-temporal data (maps, satellite, weather, drone, IoT), query and analytic services. IBM® PAIRS—Geoscope provides access to historical and continuously updated remote sensor data.

As also noted above, each simulated crop growth time series may be determined using a crop growth simulation model and based on historical crop data, geospatial data, and weather data. Common crop growth simulation models include, but are not limited to, Crop Estimation through Resource and Environment Synthesis (CERES), Decision Support System for Agrotechnology Transfer (DSSAT), and InfoCrop. The amount of input data required by crop growth simulation models varies from model to model, but crop growth simulation models often require information regarding the site, soil, initial conditions, weather, and crop management. Crop growth simulation models typically utilize accumulated weather conditions that have occurred from crop planting to the current date to provide a historical profile of crop development.

In accordance with one more embodiments, each simulated crop growth time series may include a time series with one or more crop-specific parameters (e.g., NDVI, LAI, etc.) determined using a crop growth simulation model and based on historical crop data, geospatial data, and weather data. For example, a simulated crop growth time series that includes a LAI time series may be determined using the DSSAT crop growth simulation model for each crop type/sowing date combination within a set of one or more crop types and one or more sowing dates based on historical crop data. Historical crop data, geospatial data, and weather data may serve as inputs to the DSSAT crop growth simulation model. The DSSAT crop growth simulation model inherently simulates LAI. For example, the DSSAT crop growth simulation model typically contains four main parts: the main program, a plant growth module, a soil water balance module, and a weather module. Typically, the plant growth module simulates leaf area index (LAI), which is used in the soil water balance module to compute evapotranspiration.

The historical crop data may include, for example, crop types historically grown in a crop growth region associated with the area of interest during at least one previous crop cycle and a sowing calendar for each of those crop types. In some embodiments, the crop growth region associated with the area of interest may be the area of interest, itself. In some embodiments, the crop growth region associated with the area of interest may be a crop growth region near the area of interest. In a first example, the area of interest may be a first field and the crop growth region associated with the area of interest may be a second field that is adjacent to the first field. In a second example, the area of interest may be a set of contiguous fields and the crop growth region associated with the area of interest may be a set of fields within a specified distance from the set of contiguous fields. In some embodiments, the crop growth region associated with the area of interest may be a crop growth region defined by a boundary (e.g., a physical boundary, a political boundary, etc.). For example, the area of interest may be one or more fields and the crop growth region associated with the area of interest may be a county, state, province, or other political boundary that encompasses the one or more fields.

Figure 4:
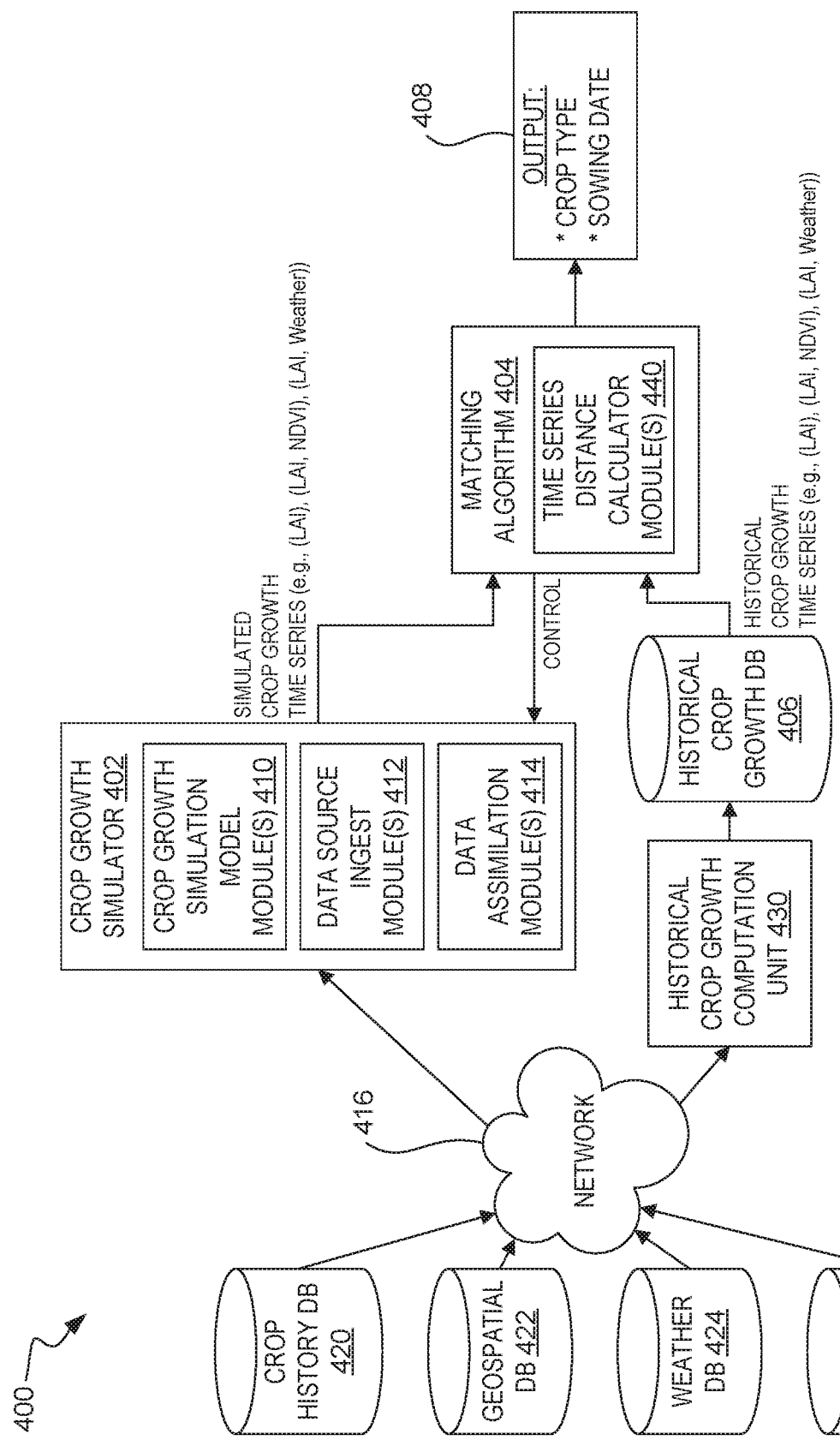
FIG. 4 depicts an exemplary system for estimation of crop type and/or sowing date, according to one or more embodiments.
Figure 9:
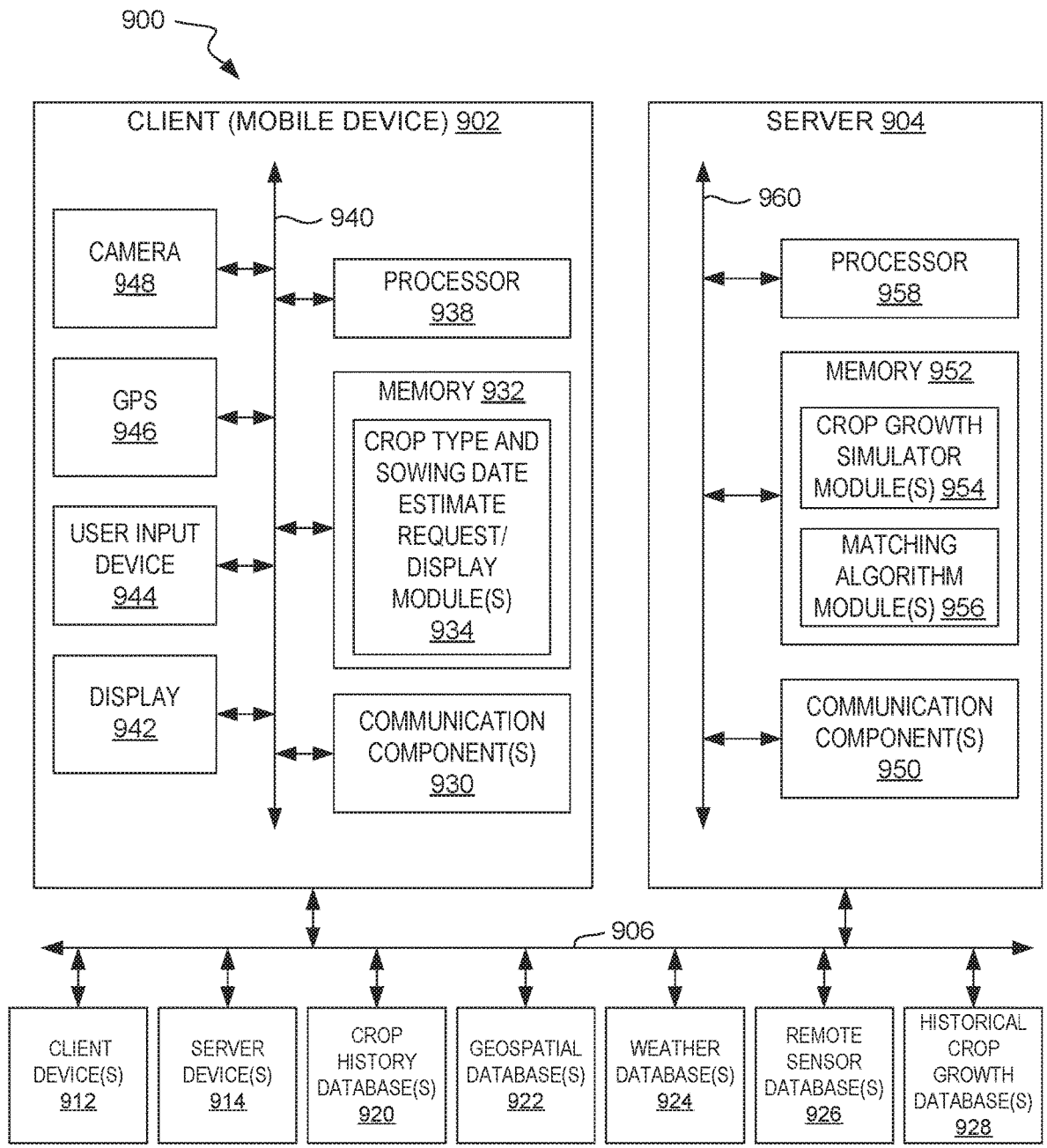
FIG. 9 illustrates a block diagram of an example, non-limiting system that facilitates estimation of crop type and/or sowing date, according to one or more embodiments.

In some embodiments, the historical crop data may be provided by one or more crop history databases (420 in FIG. 4, 920 in FIG. 9). For example, historical crop data typically may be accessed from public data sources, as well as commercial sources. Crop types historically grown in a crop growth region associated with the area of interest, for instance, typically may be accessed from public data sources, such as the U.S. Department of Agriculture's National Agricultural Statistics Service (NASS) CropScape, as well as commercial sources. Sowing calendars, for instance, typical may be accessed from public data sources, such as the U.S. Department of Agriculture's National Agricultural Statistics Service (NASS) Agricultural Handbook Number 628 "Field Crops—Usual Planting and Harvesting Dates", the United Nation's Food and Agriculture Organization (FAO) Crop Calendar, etc., as well as commercial sources.

The geospatial data may include, for example, agricultural information characterizing the area of interest. The geospatial data may include agricultural information, such as elevation, soil moisture, soil type, and other geospatial data characterizing the area of interest that may serve as input parameters to the crop growth simulation model. The geospatial data may be gathered from area of interest, gathered from one or more regions near the area of interest, and/or gathered from one or more regions representative of the area of interest.

In some embodiments, the geospatial data may be provided by one or more geospatial databases (e.g., 422 in FIG. 4, 922 in FIG. 9) or a geospatial data platform, such as IBM® PAIRS (Physical Analytics Integrated Data Repository and Services)—Geoscope. IBM® PAIRS—Geoscope provides access to historical and continuously updated geospatial data.

The weather data may include, for example, a weather time series representative of one or more weather conditions in a weather region associated with the area of interest. In some embodiments, the weather data may include observed field-level weather data that has occurred during the current growing season and current field-level weather data. The weather data may include, for example, a weather time series representative of one or more weather conditions, such as daily global solar radiation, daily maximum and minimum temperatures, daily precipitation, and other weather conditions in the weather region associated with the area of interest that may serve as input parameters to the crop growth simulation model. In some embodiments, the weather region associated with the area of interest may be the area of interest, itself. In some embodiments, the weather region associated with the area of interest may be a weather region near the area of interest. For example, the area of interest may be a field and the weather region associated with the area of interest may be a region in which is located an automatic weather station that is within a specified distance from the field. In some embodiments, the weather region associated with the area of interest may be a weather region defined by a boundary (e.g., a physical boundary, a political boundary, etc.). For example, the area of interest may be one or more fields and the weather region associated with the area of interest may be a valley or other physical boundary that encompasses the one or more fields.

In some embodiments, the weather data may be provided by one or more weather databases (e.g., 424 in FIG. 4, 924 in FIG. 9). For example, weather data may be accessed from repositories, such as the National Centers for Environmental Information (NCEI), as well as weather service providers, such as The Weather Company, WeatherBELL Analytics, Baron, and AccuWeather. NCEI is the chief repository of National Oceanic and Atmospheric Administration (NOAA) data. Weather data may also be accessed from a geospatial data platform, such as IBM® PAIRS (Physical Analytics Integrated Data Repository and Services)—Geoscope. IBM® PAIRS—Geoscope provides access to historical and continuously updated weather data The area of interest may be one or more portions of land (such as fields, plots, farms, sub-portions of the same, and the like). As used herein, an "area of interest" refers to any amount of land in any shape or size. For instance, an "area of interest" can refer to a grower's entire property, a field, a plot of land, a planting region, a zone or management zone, and the like.

In accordance with some embodiments, a crop growth simulation model, such as DSSAT, is used to generate crop-specific parameters, such as leaf area index (LAI), normalized difference vegetation index (NDVI), and the like, which a matching algorithm attempts to match against crop types from one or more historical crop cycles sown in the area of interest. Various crop growth simulation models are available in the public domain and cover the major crop types (DSSAT, for example, can simulate over 40 crop types worldwide) and models for other crop types can also be implemented.

In some embodiments, a data assimilation module (e.g., 414 in FIG. 4) may be coupled with one or more crop growth simulation modules for assimilating remote sensor data (e.g., vegetation indexes, soil moisture, and other fields).

Various data may be employed, in conjunction with the crop growth simulation model, to generate the crop-specific parameters, including, but not limited to, information in the public domain on the type of crops grown in the area of interest and the crop calendar for such crop types, high resolution geospatial data (e.g., elevation, soil moisture, soil type, etc.), and high resolution weather and remote sensor data during previous and current crop cycles. For example, the crop growth simulation model may take as input weather data, soil moisture data, an initial crop type, an initial sowing date, and other data to compute an initial simulated crop growth time series of LAI. All of this input data may be ingested into the crop growth simulation model via a data source ingest module (e.g., 412 in FIG. 4).

The initial crop type may be selected from crop types sown in the area of interest in previous crop cycles. The initial sowing date may be selected from the sowing calendar for the initial crop type.

In some embodiments, a database (e.g., 406 in FIG. 4, 928 in FIG. 9) may supply historical crop cycle information on LAI, NDVI, etc. (e.g., a historical crop growth time series of LAI for the current crop cycle) derived from remote sensing, including field images from satellites, aerial drones, aircraft, or by other mechanisms (e.g., ground-based robots, and sensors mounted on field and farm equipment). In some embodiments, the historical crop cycle information supplied by the database may be for the current crop cycle. In other embodiments, the historical crop cycle information supplied by the database may be for one or more previous crop cycles. In some embodiments, the historical crop cycle information supplied by the database may include crop-specific parameters and other types of data, such as weather data (e.g., a historical crop growth time series of LAI for the current crop cycle as one element of the time series, as well as weather data for the current crop cycle as one or more other elements of the time series).

A matching algorithm may take, as input, the crop-specific parameters (e.g., time series of LAI of crop types sown in the area of interest during one or more previous crop cycles—for instance, a simulated LAI time series for each of the crop types sown in the area of interest during one or more previous crop cycles and a historical LAI time series based on remote sensor data captured from the area of interest during the current crop cycle) and compute the distance between each simulated LAI time series and the historical LAI time series, and then perform a ranking of the computed distances. For example, the matching algorithm may include a time series distance calculator that attempts to align two datasets via distance matrix time series matching. The first dataset provided as input to the time series distance calculator may be a time series dataset obtained from the crop growth simulation model, with one simulation output each day in accordance with some embodiments, but in general a periodically simulated dataset. The second dataset provided as input to the time series distance calculator may be a time series dataset obtained from the remote sensor, with one remote sensing input obtained from the remote sensor each day in accordance with some embodiments, but in general a periodic sensing. The datasets built on one input per day utilized in the embodiments described above are exemplary, and not limiting. For example, other embodiments may utilize datasets built on multiple inputs each day or any other suitable periodicity duration.

In the time series distance calculator, in accordance with some embodiments, each element in the time series is matched. That is, a difference is computed between each element of the simulated data and observed data, and a difference score is computed and stored. The difference score may be computed by summing up the computed differences (i.e., the differences computed for the respective elements in the time series). The observed data may be a historical crop growth time series for an area of interest and includes one or more elements including one or more crop-specific parameters (e.g., LAI, NDVI, and the like) and, optionally, other data (e.g., weather). The simulated data may be a simulated crop growth time series that includes the same one or more crop-specific parameters (e.g., LAI, NDVI, and the like) and, optionally, the same other data (e.g., weather).

In some embodiments, the simulated time series is temporally shifted, in either direction, one time slot at a time (a time slot being the periodicity duration that a snapshot is taken), and the difference score is recomputed and stored. For example, the matching algorithm may send control data to the crop growth simulation model to advance the initial sowing date by one day. The crop growth simulation model may then send a temporally shifted time series (i.e., a time series wherein the sowing date is advanced one day from the initial sowing date) to the matching algorithm, which then re-computes and stores the difference score. The matching algorithm may then send control data to the crop growth simulation model to advance the sowing date by one additional day. The crop growth simulation model then sends another temporally shifted time series (i.e., a time series wherein the sowing date is advanced two days from the initial sowing date) to the matching algorithm, which then re-computes and stores the difference score. This sequence may be repeated for each sowing date within a crop type's sowing calendar, as well as for each crop type historically grown in the area of interest (or in a crop growth region associated with the area of interest).

The time series simulated with the lowest difference score may be taken as the final result. For example, an estimate of crop type and/or sowing date may be obtained as per this simulation (i.e., the simulation that produced the lowest difference score). That is, the crop type and sowing date used by the crop growth simulation model in determining this simulation (i.e., the simulation that produced the lowest difference score) provide the estimate of crop type and/or sowing date.

An emerging information technology (IT) delivery model is cloud computing, by which shared resources, software, and information are provided over the Internet to computers and other devices on-demand. Cloud computing can significantly reduce IT costs and complexities while improving workload optimization and service delivery. With this approach, an application instance can be hosted and made available from Internet-based resources that are accessible through a conventional Web browser over HTTP. An example application might be one that provides a common set of messaging functions, such as email, calendaring, contact management, and instant messaging. A user would then access the service directly over the Internet. Using this service, an enterprise would place its email, calendar, and/or collaboration infrastructure in the cloud, and an end user would use an appropriate client to access his or her email, or perform a calendar operation.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, as well as removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"), and other non-removable, non-volatile media (e.g., a "solid-state drive"). Although not shown, a magnetic disk drive for reading from and writing to a removable, non-volatile magnetic disk (e.g., a "floppy disk"), and an optical disk drive for reading from and/or writing to a removable, non-volatile optical disk such as a CD-ROM, DVD-ROM or other optical media can be provided. In such instances, each can be connected to a bus 18 by one or more data media interfaces. As will be further described below, memory 28 may include a computer program product storing a set (e.g., at least one) of program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. In some embodiments, program modules 42 are adapted to generally carry out the one or more functions and/or methodologies of one or more embodiments.

Computer system/server 12 may also communicate with one or more external devices 14 such as a keyboard, a pointing device, a display 24, etc.; one or more devices that enable a user to interact with computer system/server 12; and/or any device (e.g., network card, modem, etc.) that enable computer system/server 12 to communicate with one or more other computing devices. Such communication can occur via Input/Output (I/O) interfaces 22. Still further, computer system/server 12 can communicate with one or more networks such as a local area network (LAN), a general wide area network (WAN), and/or a public network (e.g., the Internet) via network adapter 20. As depicted, the network adapter 20 communicates with other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
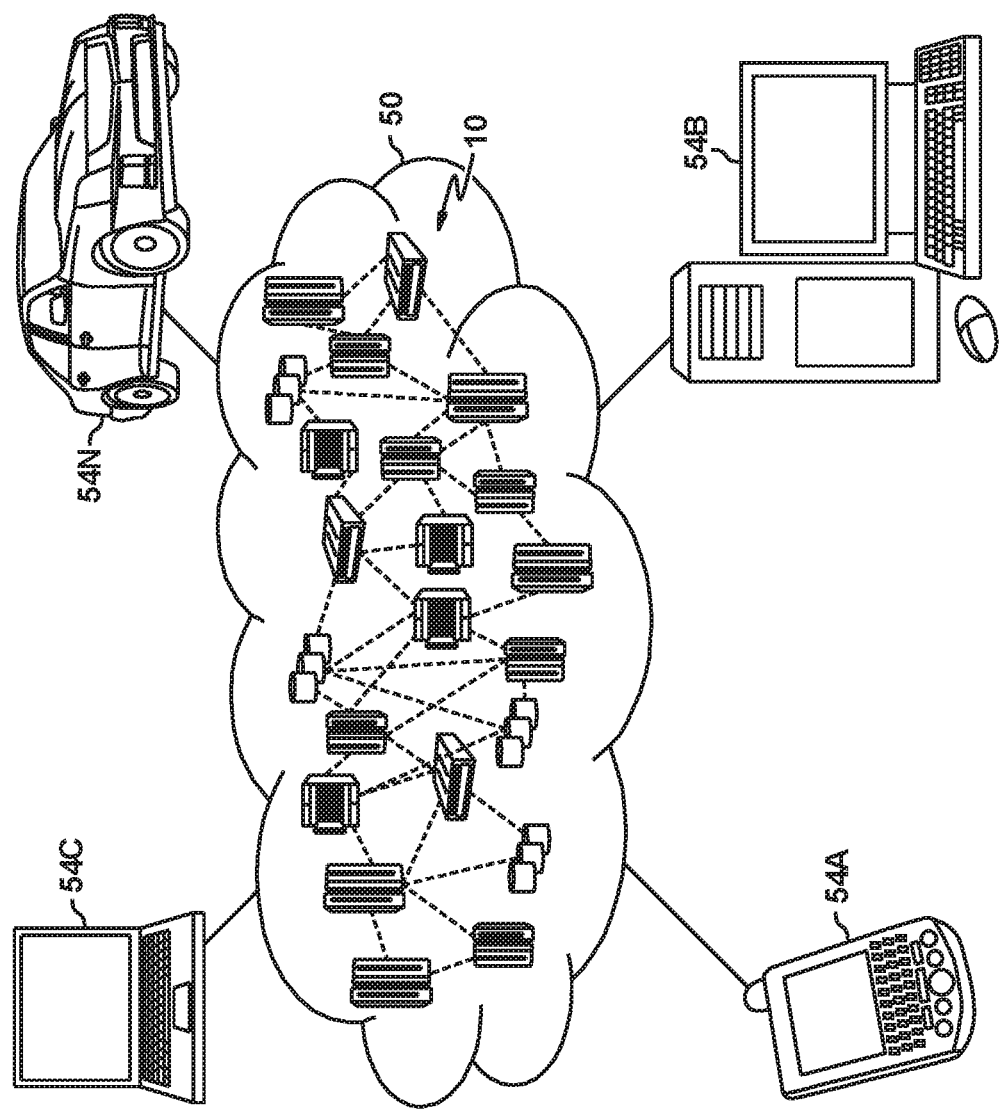
FIG. 2 depicts a cloud computing environment, according to one or more embodiments.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
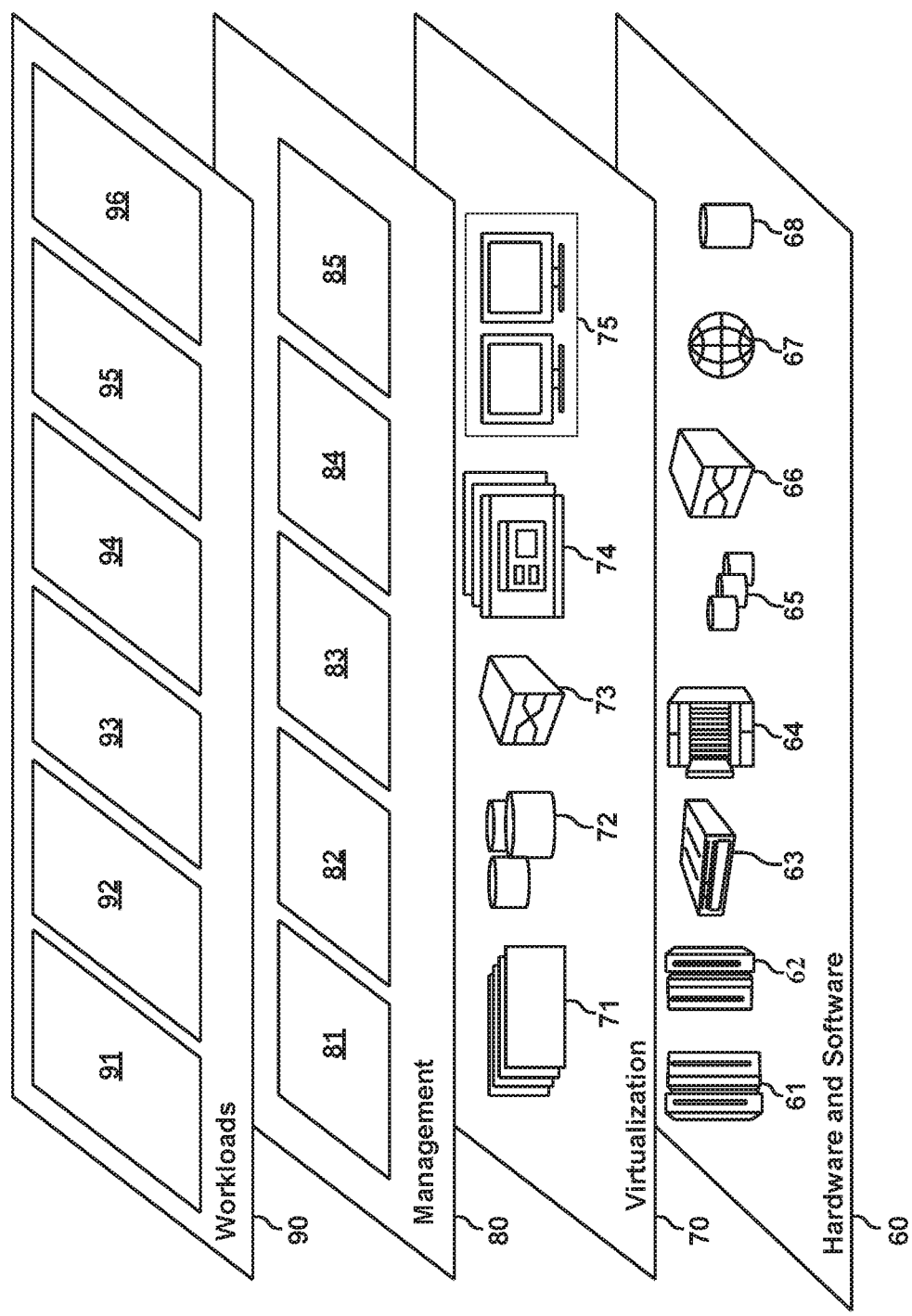
FIG. 3 depicts abstraction model layers, according to one or more embodiments.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and estimation of crop type and/or sowing date 96.

Referring now to FIG. 4, depicted is an exemplary system 400 for estimating crop type and/or sowing date in accordance with one or more embodiments. The exemplary system 400 illustrated in FIG. 4 includes a crop growth simulator 402, a matching algorithm 404, and a historical crop growth database 406. The matching algorithm 404 matches simulated crop growth time series generated by the crop growth simulator 402 against a historical crop growth time series received from the historical crop growth database 406 to determine an estimated crop type and/or sowing date as an output 408.

In some embodiments, the crop growth simulator 402 includes one or more crop growth simulation model modules 410, one or more data source ingest modules 412, and one or more data assimilation modules 414. The crop growth simulator 402 may use the one or more crop growth simulation model modules 410 to determine, for each crop type/sowing date combination within a set of one or more crop types and one or more sowing dates, a simulated crop growth time series for an area of interest based on historical crop data from one or more crop history databases 420, geospatial data from one or more geospatial databases 422, and weather data from one or more weather databases 424 (and, optionally, remote sensor data from one or more remote sensor databases 426) over one or more networks 416. Such networks 416 may include wired and wireless networks, including, but not limited to, a cellular network, a wide area network (WAN) (e.g., the Internet), and/or a local area network (LAN), non-limiting examples of which include cellular, WAN, wireless fidelity (Wi-Fi), Wi-Mal, WLAN, radio communication, microwave communication, satellite communication, optical communication, sonic communication, electromagnetic induction communication, quantum communication, and/or any other suitable communication technology.

In some embodiments, each simulated crop growth time series generated by the crop growth simulator 402 includes one or more elements including one or more crop-specific parameters (e.g. LAI, NDVI, etc.) and, optionally, other data (e.g., weather).

The historical crop data received by the crop growth simulator 402 from the one or more crop history databases 420 may include, for example, crop types historically grown in a crop growth region associated with the area of interest during at least one previous crop cycle and a sowing calendar for each of those crop types.

The geospatial data received by the crop growth simulator 402 from the one from the one or more geospatial databases 422 may include, for example, agricultural information characterizing the area of interest.

The weather data received by the crop growth simulator 402 from the one or more weather databases 424 may include, for example, a weather time series representative of one or more weather conditions in a weather region associated with the area of interest.

All of this input data (i.e., the historical crop data, the geospatial data, and the weather data received from the crop history, geospatial, and weather databases 420, 422, and 424, respectively) may be ingested into the crop growth simulator 402 by the one or more data ingest modules 412. For example, the crop growth simulator 402 may take as input weather data, soil moisture data, an initial crop type, an initial sowing date, and other data to compute an initial simulated crop growth time series. The initial crop type may be, for example, selected from crop types sown in the area of interest in previous crop cycles. The initial sowing date may be, for example, selected from the sowing calendar for the initial crop type.

In addition, all of this input data (i.e., the historical crop data, the geospatial data, and the weather data received from the crop history, geospatial, and weather databases 420, 422, and 424, respectively) may be augmented by remote sensor data from the one or more remote sensor databases 426. This optional remote sensor data may be ingested into the crop growth simulator 402 by the one or more data assimilation modules 414.

The historical crop growth time series received by the matching algorithm 404 from the historical crop growth database 406 may be based on remote sensor data, such as a time series of image data of the area of interest. In some embodiments, the historical crop growth time series includes one or more elements including one or more crop-specific parameters (e.g. LAI, NDVI, etc.) and, optionally, other data (e.g., weather).

In the embodiment illustrated in FIG. 4, the historical crop growth time series received by the matching algorithm 404 from the historical crop growth database 406 is computed by a historical crop growth computation unit 430. For example, the historical crop growth computation unit 430 may periodically (e.g., daily) receive remote sensor data (e.g., satellite image data of the area of interest) from the one or more remote sensor databases 426 over the one or more networks 416, compute one or more crop-specific parameters (e.g., LAI, NDVI, etc.) based on the received remote sensor data, and update the historical crop growth time series stored on the historical crop growth database 406 using the computed one or more crop-specific parameters.

The matching algorithm 404 includes one or more time series distance calculator modules 440 that attempt to align the two datasets, i.e., the simulated crop growth time series received from the crop growth simulator 402 and the historical crop growth time series received from the historical crop growth database 406. In some embodiments, these two datasets have a daily periodicity duration. Such datasets built on one input per day, however, are exemplary, and not limiting. For example, other embodiments may utilize datasets built on multiple inputs each day or any other suitable periodicity duration.

In the time series distance calculator module 440, in accordance with some embodiments, each element in the respective time series is matched. That is, a difference is computed between each element of the simulated crop growth time series from the crop growth simulator 402 and the historical crop growth time series from the historical crop growth database 406, and a difference score is computed and stored. The difference score may be computed by summing up the computed differences (i.e., the differences computed for the respective elements in the time series).

In some embodiments, the initial simulated crop growth time series is then temporally shifted, in either direction, one time slot at a time (a time slot being the periodicity duration that a snapshot is taken), and the difference score is recomputed and stored. For example, the matching algorithm 404 may send control data to the crop growth simulator 402 to advance the initial sowing date by one day. The crop growth simulator 402 may then send a temporally shifted time series (i.e., a time series wherein the sowing date is advanced one day from the initial sowing date) to the matching algorithm 404, and then the time series distance calculator module 440 re-computes and stores the difference score. The matching algorithm 404 may then send control data to the crop growth simulator 402 to advance the sowing date by one additional day. The crop growth simulator 402 then sends another temporally shifted time series (i.e., a time series wherein the sowing date is advanced two days from the initial sowing date) to the matching algorithm 404, and then the time series distance calculator module 440 re-computes and stores the difference score. This sequence may be repeated for each sowing date within a crop type's sowing calendar, as well as for each crop type historically grown in the area of interest (or in a crop growth region associated with the area of interest). The matching algorithm 404 may then determine the time series simulated with the lowest difference score, i.e., the particular simulation generated by the crop growth simulator 402 that produced the lowest difference score.

The time series simulated with the lowest difference score may be taken as the final result. For example, the matching algorithm 404 may output an estimate of crop type and/or sowing date according to this simulation (i.e., the simulation that produced the lowest difference score). In other words, the estimate of crop type and/or sowing date output 408 of the matching algorithm 404 may be based on the crop type and the sowing date used by the crop growth simulator 402 to generate the particular simulation that produced the lowest difference score.

In some embodiments, the area of interest may contain one or more regions (e.g., fields) with different crop types. The matching algorithm may, in accordance with some embodiments, identify these regions using one or more segmentation methods. For example, in some embodiments, the matching algorithm may use a per-pixel approach wherein each pixel is matched and a similarity threshold is applied to determine the boundary of these regions.

In some embodiments, the matching algorithm may use a per-field approach wherein each field is matched using digitized field boundaries. Digitized field boundaries may be produced, for example, by digitizing farm plot outlines using orthophotographs (e.g., 1 m resolution). In another example, a client system (e.g., 902 in FIG. 9) may provide positional coordinates and/or platting data from which the digitized field boundaries may be produced.

Figure 5:
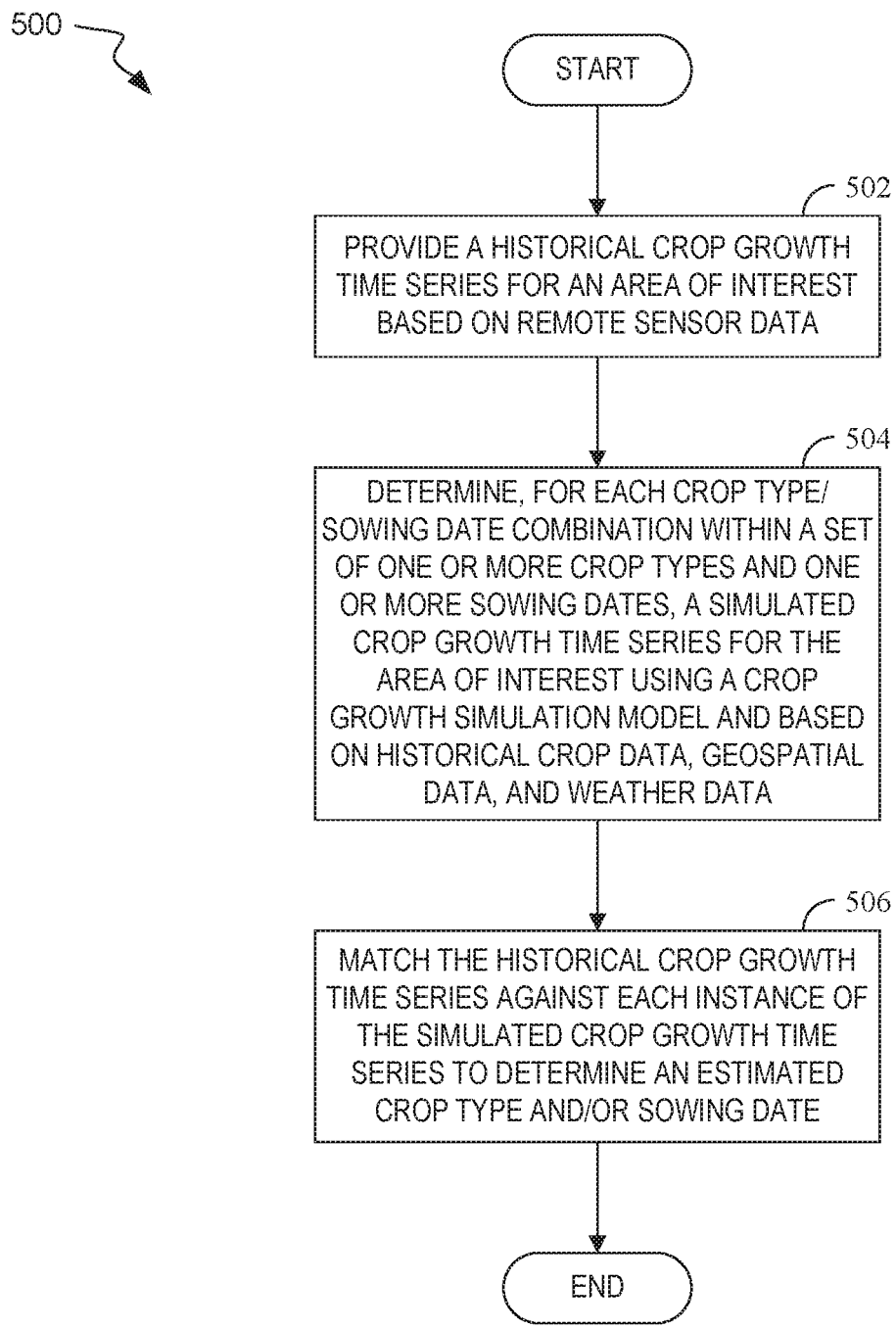
FIG. 5 depicts a flow diagram of an illustrative method of estimating crop type and/or sowing date, according to one or more embodiments.

Referring now to FIG. 5, a flow diagram of an illustrative method 500 of estimating crop type and/or sowing date is depicted in accordance with one or more embodiments. The method 500 sets forth the preferred order of the blocks. It must be understood, however, that the various blocks may occur at any time relative to one another.

The method 500 begins by providing a historical crop growth time series for an area of interest based on remote sensor data (block 502). For example, a matching algorithm may receive (e.g., from a historical crop growth database) a historical crop growth time series for the area of interest based on remote sensor data, such as a time series of image data of the area of interest. The historical crop growth time series may be determined using a historical crop growth computation unit, for example, which may then store the determined historical crop growth time series in the historical crop growth database for subsequent retrieval by the matching algorithm. In some embodiments, the historical crop growth time series includes one or more elements including one or more crop-specific parameters (e.g. LAI, NDVI, etc.) and, optionally, other data (e.g., weather). For example, the historical growth time series may include a historical LAI time series determined (e.g., computed according to Equations (1)-(4), above) by the historical crop growth computation unit based on a time series of optical image data of the area of interest.

Figure 6:
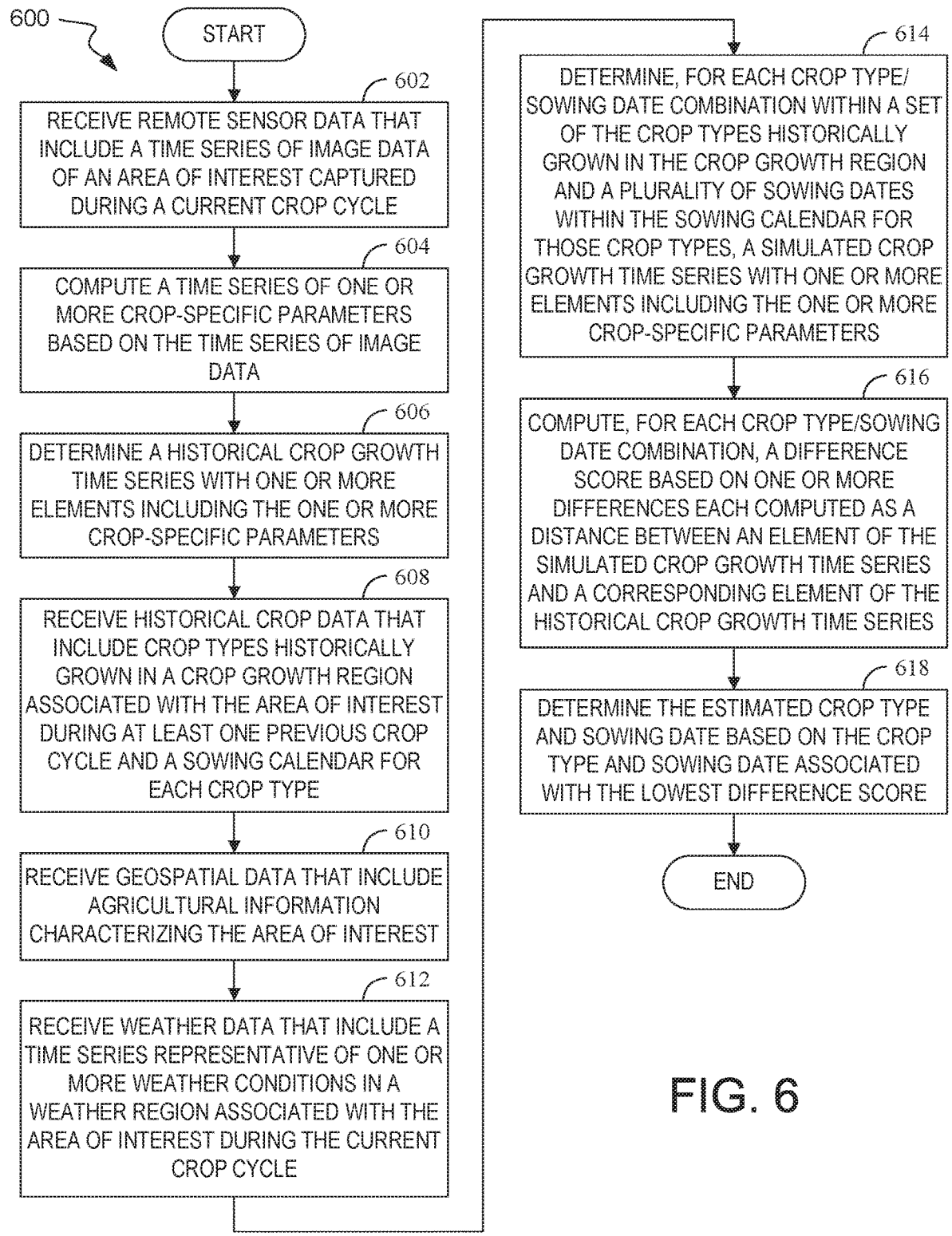
FIG. 6 depicts a flow chart of an exemplary implementation of the illustrative method of estimating crop type and/or sowing date shown in FIG. 5, according to one or more embodiments.
Figure 7A:
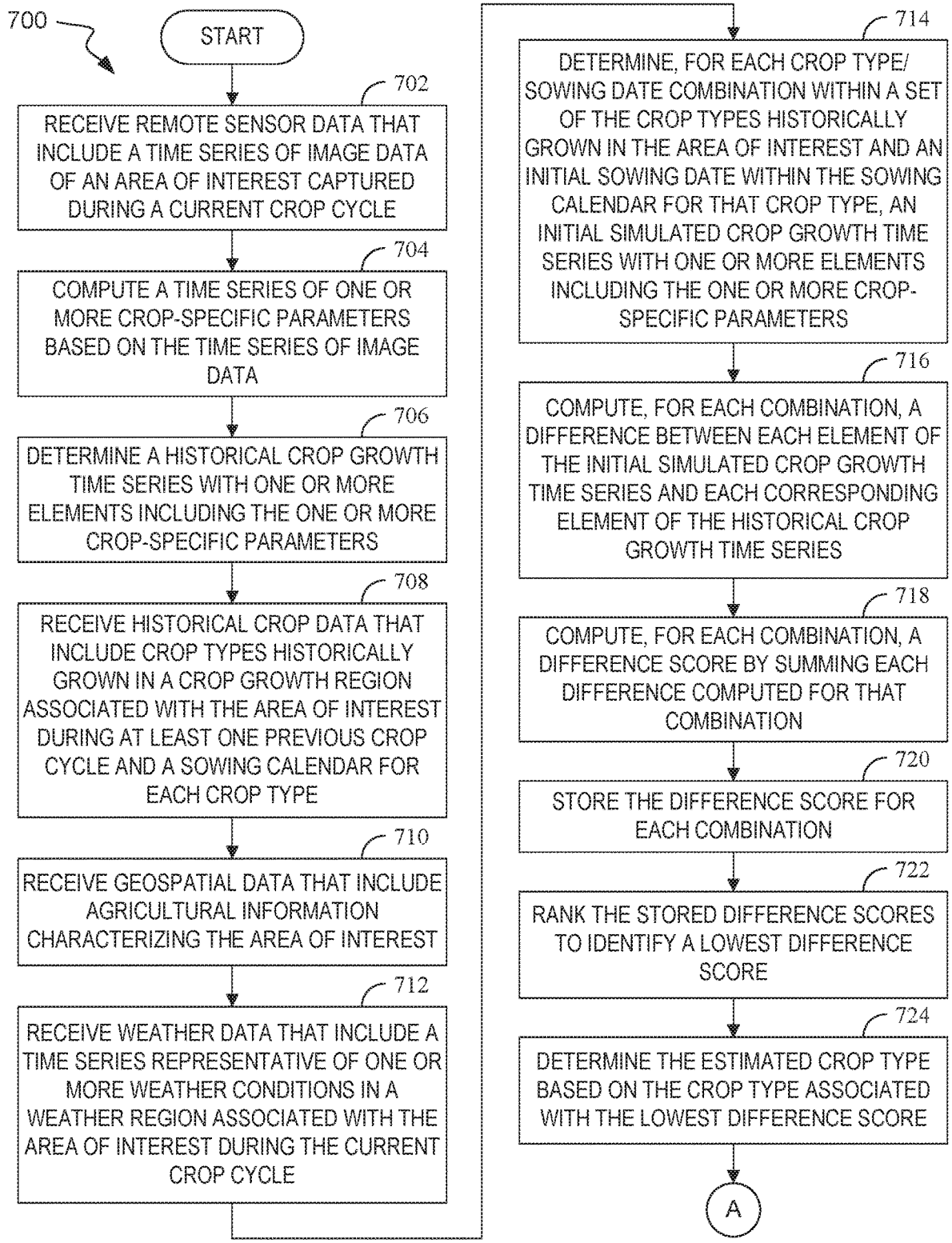
FIGS. 7A and 7B depict a flow diagram of another exemplary implementation of the illustrative method of estimating crop type and/or sowing date shown in FIG. 5, wherein crop type is estimated in a first stage (FIG. 7A) and sowing date is estimated in a second stage (FIG. 7B), according to one or more embodiments.
Figure 7B:
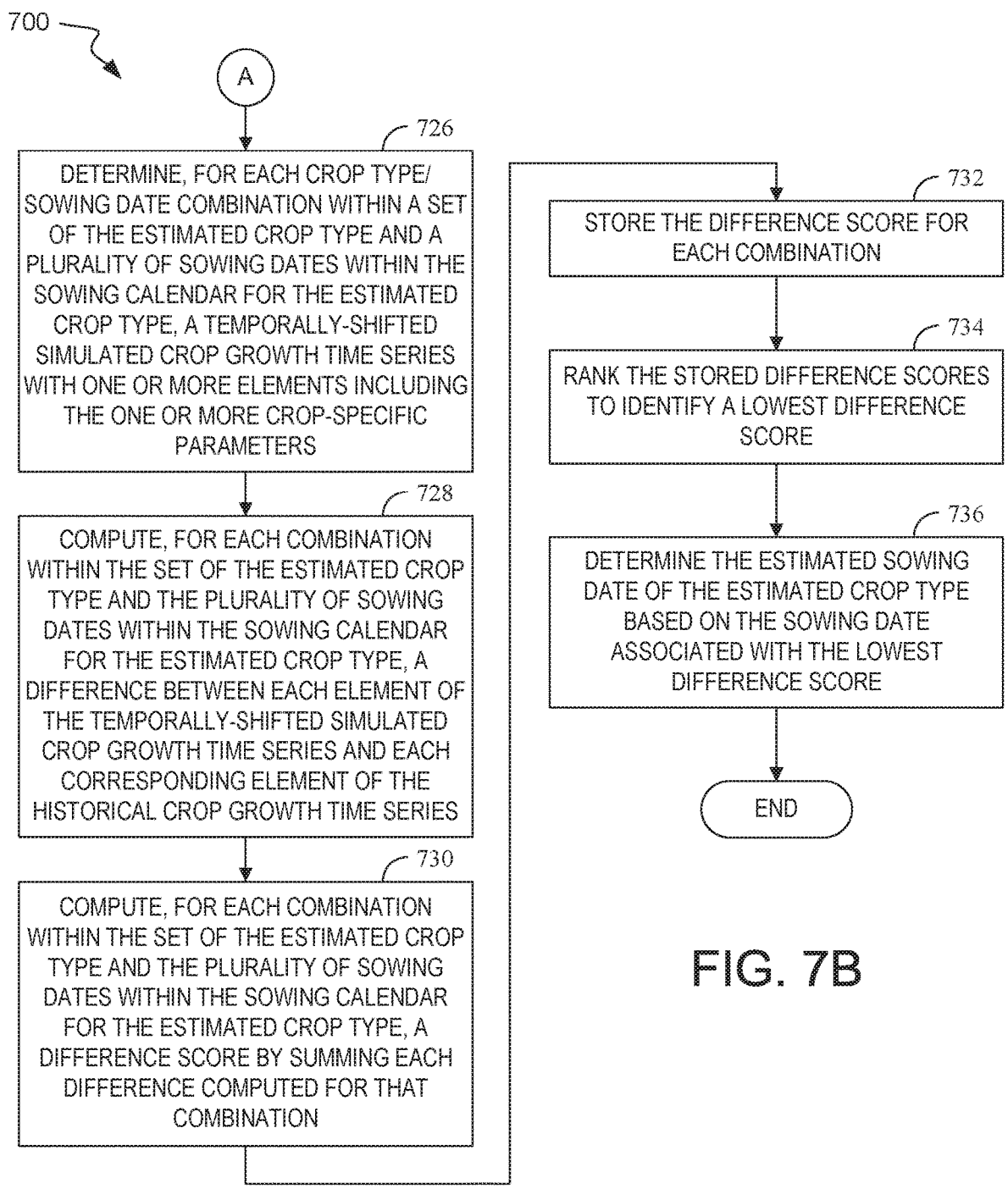

In some embodiments, the historical crop growth time series for the area of interest may be based on remote sensor data captured during a current crop cycle. Examples of such current crop cycle embodiments are depicted in FIG. 6 and FIGS. 7A and 7B, described below.

Figure 8:
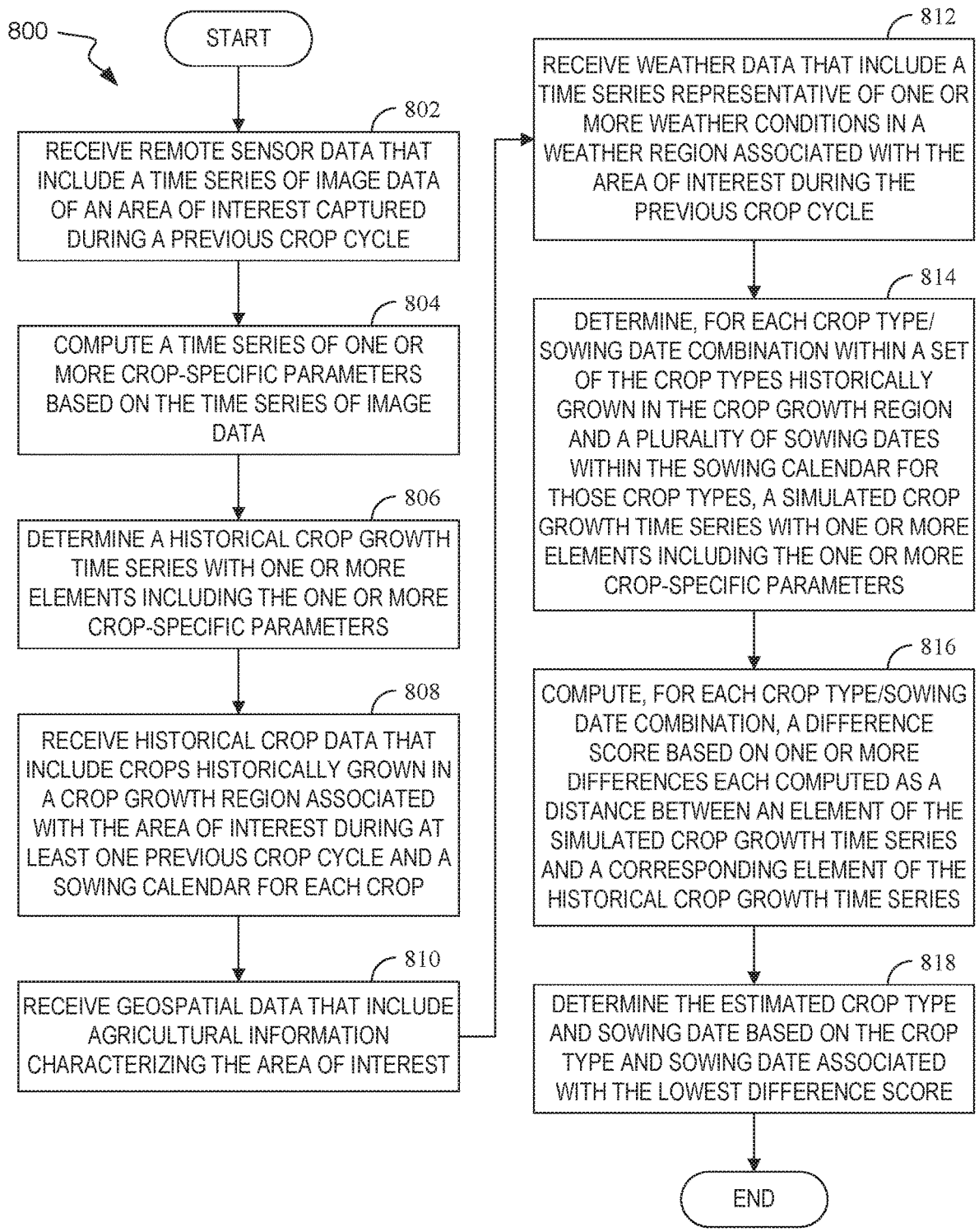
FIG. 8 depicts a flow chart of yet another exemplary implementation of the illustrative method of estimating crop type and/or sowing date shown in FIG. 5, according to one or more embodiments.

In some embodiments, the historical crop growth time series for the area of interest may be based on remote sensor data captured during a previous crop cycle. For example, crop growth time series produced by the crop growth simulation model may be matched against a historical crop growth time series from a previous crop cycle, with a known crop type and a known sowing date. An example of such previous crop cycle embodiments is depicted in FIG. 8, described below.

The method 500 continues by determining, for each crop type/sowing date combination within a set of one or more crop types and one or more sowing dates, a simulated crop growth time series for the area of interest using one or more crop growth simulation models and based on historical crop data, geospatial data, and weather data (block 504). For example, a crop growth simulator may use one or more crop growth simulation models to determine, for each crop type/sowing date combination within a set of one or more crop types and one or more sowing dates, a simulated crop growth time series for an area of interest based on historical crop data from one or more crop history databases, geospatial data from one or more geospatial databases, and weather data from one or more weather databases (and, optionally, remote sensor data from one or more remote sensor databases). In some embodiments, each simulated crop growth time series generated by the crop growth simulator includes one or more elements including one or more crop-specific parameters (e.g. LAI, NDVI, etc.) and, optionally, other data (e.g., weather). For example, each simulated crop growth time series may include a simulated LAI time series determined by the one or more crop growth simulation models of the crop growth simulator. The DSSAT crop growth simulation model, for example, inherently simulates LAI.

The historical crop data received by the crop growth simulator may include, for example, crop types historically grown in a crop growth region associated with the area of interest during at least one previous crop cycle and a sowing calendar for each of those crop types. The geospatial data received by the crop growth simulator may include, for example, agricultural information characterizing the area of interest. The weather data received by the crop growth simulator may include, for example, a weather time series representative of one or more weather conditions in a weather region associated with the area of interest.

The method 500 continues by matching the historical crop growth time series against each instance of the simulated crop growth time series to determine an estimated crop type and/or sowing date (block 506). For example, a matching algorithm may match simulated crop growth time series generated by a crop growth simulator against the historical crop growth time series received from a historical crop growth database to determine, as an output, estimated crop type and/or sowing date. In some embodiments, the matching algorithm includes one or more time series distance calculator modules that attempt to align the two datasets (i.e., each instance of the simulated crop growth time series received from the crop growth simulator and the historical crop growth time series received from the historical crop growth database), to determine an estimate of crop type and/or sowing date based on the instance of the simulated crop growth time series that produced the lowest difference score. The method 500 may then end.

In some embodiments, the method 500 may be implemented in a single stage, in which crop type and sowing date are estimated simultaneously. An exemplary single-stage implementation is depicted in FIG. 6, described below. In some embodiments, the method 500 may be implemented in two stages, in which the crop type is estimated in a first stage and the sowing date is estimated in a second stage. An exemplary two-stage implementation is depicted in FIGS. 7A and 7B, described below.

In some embodiments, the method 500 may be implemented using time series with elements that include, in addition to one or more crop-specific parameters, other data (e.g., weather).

Referring now to FIG. 6, a flow chart of an exemplary method 600 of estimating crop type and/or sowing date is depicted in accordance with one or more embodiments. FIG. 6 depicts an exemplary implementation of the illustrative method of estimating crop type and/or sowing date shown in FIG. 5. The method 600 sets forth the preferred order of the blocks. It must be understood, however, that the various blocks may occur at any time relative to one another.

The method 600 begins by receiving remote sensor data that include a time series of image data of an area of interest captured during a current crop cycle (block 602). For example, at a historical crop growth computation unit, a time series of image data of an area of interest captured during a current crop cycle from a remote sensor database may be received.

The method 600 continues by computing a time series of one or more crop-specific parameters based on the time series of image data (block 604). For example, at the historical crop growth computation unit, a time series of one or more crop-specific parameters (e.g., LAI, NDVI, etc.)

based on the time series of image data may be computed. Based on a time series of optical image data of the area of interest, for example, the historical crop growth computation unit may compute a LAI time series according to Equations (1)-(4), above.

Next, the method 600 continues by determining a historical crop growth time series with one or more elements including the one or more crop-specific parameters (block 606). For example, at the historical crop growth computation unit, a historical crop growth time series with one or more elements including the one or more crop-specific parameters (e.g., LAI, NDVI, etc.) may be determined. In some embodiments, the historical crop growth time series determined in block 606 may include the time series computed in block 604, without any additional elements. For example, a historical LAI time series may be determined. In some embodiments, the historical crop growth time series determined in block 606 may include the time series computed in block 604, plus one or more additional elements such as weather data.

In some embodiments, the historical crop growth time series determined in block 606 may be directly provided as input to a matching algorithm. In some embodiments, the historical crop growth time series determined in block 606 may be stored in a historical crop growth database and subsequently provided to the matching algorithm.

In some embodiments, blocks 602, 604, and 606 may correspond to block 502 in FIG. 5 (i.e., providing a historical crop growth time series for an area of interest based on remote sensor data).

The method 600 continues by receiving historical crop data that include crop types historically grown in a crop growth region associated with the area of interest during at least one previous crop cycle and a sowing calendar for each crop type (block 608). For example, at a crop growth simulator, historical crop data that include crop types historically grown in a crop growth region associated with the area of interest during at least one previous crop cycle and a sowing calendar for each of those crop types may be received. In some embodiments, the historical crop data may be received over a network from a crop history database and ingested into a crop growth simulation model of the crop growth simulator via a data source ingest module.

Next, the method 600 continues by receiving geospatial data that include agricultural information characterizing the area of interest (block 610). For example, at the crop growth simulator, geospatial data that include agricultural information characterizing the area of interest may be received. In some embodiments, the geospatial data may be received over a network from a geospatial database and ingested into the crop growth simulation model of the crop growth simulator via the data source ingest module.

The method 600 then continues by receiving weather data that include a time series representative of one or more weather conditions in a weather region associated with the area of interest during the current crop cycle (block 612). For example, at the crop growth simulator, weather data that include a time series representative of one or more weather conditions in a weather region associated with the area of interest during the current crop cycle may be received. In some embodiments, the weather data may be received over a network from a weather database and ingested into the crop growth simulation model of the crop growth simulator via the data source ingest module.

Next, the method 600 continues by determining, for each crop type/sowing date combination within a set of the crop types historically grown in the crop growth region and a plurality of sowing dates within the sowing calendar for those crop types, a simulated crop growth time series with one or more elements including the one or more crop-specific parameters (block 614). For example, at the crop growth simulator, a plurality of simulated crop growth time series may be determined each with one or more elements including the one or more crop-specific parameters (e.g., LAI, NDVI, etc.), i.e., the same crop-specific parameters as the historical crop growth time series determined in block 606. In some embodiments, the crop growth simulation model of the crop growth simulator determines one simulated crop growth time series for each crop type/sowing date combination. For example, at the crop growth simulator, a simulated LAI time series for each crop type/sowing date combination may be determined using the DSSAT crop growth simulation model, which inherently simulates LAI.

In some embodiments, the plurality of simulated crop growth time series determined in block 614 may include the one or more crop-specific parameters (e.g., LAI, NDVI, etc.), without any additional elements. For example, a plurality of simulated LAI time series may be determined. In some embodiments, the plurality of simulated crop growth time series determined in block 614 may include the one or more crop-specific parameters (e.g., LAI, NDVI, etc.), plus one or more additional elements such as weather data.

In some embodiments, the plurality of simulated crop growth time series determined in block 614 may be provided en masse as input to the matching algorithm. In some embodiments, the plurality of simulated crop growth time series determined in block 614 may be selectively provided (e.g., one simulated crop growth time series at a time, responsive to control data) as input to the matching algorithm.

In some embodiments, blocks 608, 610, 612, and 614 may correspond to block 504 in FIG. 5 (i.e., determining, for each crop type/sowing date combination within a set of one or more crop types and one or more sowing dates, a simulated crop growth time series for the area of interest using one or more crop growth simulation models and based on historical crop data, geospatial data, and weather data).

The method 600 continues by computing, for each crop type/sowing date combination, a difference score based on one or more differences each computed as a distance between an element of the simulated crop growth time series and a corresponding element of the historical crop growth time series (block 616). For example, at the matching algorithm, a difference may be computed between each element of each simulated crop growth time series from the crop growth simulator and the historical crop growth time series from the historical crop growth database, and a difference score may be computed and stored. The difference score may be computed by summing up the computed differences (i.e., the differences computed for the respective elements in the time series).

Next, the method 600 continues by determining the estimated crop type and sowing date based on the crop type and sowing date associated with the lowest difference score (block 618). For example, at the matching algorithm, the time series simulated with the lowest difference score may be taken as the final result. For example, the matching algorithm may output an estimate of crop type and/or sowing date according to this simulation (i.e., the simulation that produced the lowest difference score). In other words, the estimate of crop type and/or sowing date output of the matching algorithm may be based on the crop type and the sowing date used by the crop growth simulator to generate the particular simulation that produced the lowest difference score. The method 600 may then end.

In some embodiments, blocks 616 and 618 may correspond to block 506 in FIG. 5 (i.e., matching the historical crop growth time series against each instance of the simulated crop growth time series to determine an estimated crop type and/or sowing date).

Referring now to FIGS. 7A and 7B, a flow diagram of an exemplary method 700 of estimating crop type and/or sowing date is depicted in accordance with one or more embodiments. FIGS. 7A and 7B depict an exemplary two-stage implementation of the illustrative method of estimating crop type and/or sowing date shown in FIG. 5, in which the crop type and the sowing date are separately estimated in two stages. FIG. 7A corresponds to a first stage, in which the crop type is estimated; whereas, FIG. 7B corresponds to a second stage, in which the sowing date is estimated. The method 700 sets forth the preferred order of the blocks. It must be understood, however, that the various blocks may occur at any time relative to one another.

The method 700 begins by receiving remote sensor data that include a time series of image data of an area of interest captured during a current crop cycle (block 702). For example, at a historical crop growth computation unit, a time series of image data of an area of interest captured during a current crop cycle from a remote sensor database may be received.

The method 700 continues by computing a time series of one or more crop-specific parameters based on the time series of image data (block 704). For example, at the historical crop growth computation unit, a time series of one or more crop-specific parameters (e.g., LAI, NDVI, etc.) based on the time series of image data may be computed. Based on a time series of optical image data of the area of interest, for example, the historical crop growth computation unit may compute a LAI time series according to Equations (1)-(4), above.

Next, the method 700 continues by determining a historical crop growth time series with one or more elements including the one or more crop-specific parameters (block 706). For example, at the historical crop growth computation unit, a historical crop growth time series with one or more elements including the one or more crop-specific parameters (e.g., LAI, NDVI, etc.) may be determined. In some embodiments, the historical crop growth time series determined in block 706 may include the time series computed in block 704, without any additional elements. For example, a historical LAI time series may be determined. In some embodiments, the historical crop growth time series determined in block 706 may include the time series computed in block 704, plus one or more additional elements such as weather data.

In some embodiments, the historical crop growth time series determined in block 706 may be directly provided as input to a matching algorithm. In some embodiments, the historical crop growth time series determined in block 706 may be stored in a historical crop growth database and subsequently provided to the matching algorithm.

In some embodiments, blocks 702, 704, and 706 may correspond to block 502 in FIG. 5 (i.e., providing a historical crop growth time series for an area of interest based on remote sensor data).

The method 700 continues by receiving historical crop data that include crop types historically grown in a crop growth region associated with the area of interest during at least one previous crop cycle and a sowing calendar for each crop type (block 708). For example, at a crop growth simulator, historical crop data that include crop types historically grown in a crop growth region associated with the area of interest during at least one previous crop cycle and a sowing calendar for each of those crop types may be received. In some embodiments, the historical crop data may be received over a network from a crop history database and ingested into a crop growth simulation model of the crop growth simulator via a data source ingest module.

Next, the method 700 continues by receiving geospatial data that include agricultural information characterizing the area of interest (block 710). For example, at the crop growth simulator, geospatial data that include agricultural information characterizing the area of interest may be received. In some embodiments, the geospatial data may be received over a network from a geospatial database and ingested into the crop growth simulation model of the crop growth simulator via the data source ingest module.

The method 700 then continues by receiving weather data that include a time series representative of one or more weather conditions in a weather region associated with the area of interest during the current crop cycle (block 712). For example, at the crop growth simulator, weather data that include a time series representative of one or more weather conditions in a weather region associated with the area of interest during the current crop cycle may be received. In some embodiments, the weather data may be received over a network from a weather database and ingested into the crop growth simulation model of the crop growth simulator via the data source ingest module.

Next, the method 700 continues by determining, for each crop type/sowing date combination within a set of the crop types historically grown in the crop growth region and an initial sowing date within the sowing calendar for those crop types, an initial simulated crop growth time series with one or more elements including the one or more crop-specific parameters (block 714). For example, at the crop growth simulator, a plurality of initial simulated crop growth time series may be determined each with one or more elements including the one or more crop-specific parameters (e.g., LAI, NDVI, etc.), i.e., the same crop-specific parameters as the historical crop growth time series determined in block 706. In some embodiments, the crop growth simulation model of the crop growth simulator determines an initial simulated crop growth time series for each crop type/initial sowing date combination. For example, at the crop growth simulator, an initial simulated LAI time series for each crop type/initial sowing date combination may be determined using the DS SAT crop growth simulation model, which inherently simulates LAI. In some embodiments, each crop type may have its own initial sowing date. For example, the initial sowing date for each crop type may be a predefined date within the sowing calendar for that crop type, such as the sowing calendar's "begin" date, one of the sowing calendar's "most active" dates (e.g., the median date of the "most active" dates), or the sowing calendar's "end" date.

In some embodiments, the plurality of initial simulated crop growth time series determined in block 714 may include the one or more crop-specific parameters (e.g., LAI, NDVI, etc.), without any additional elements. For example, a plurality of initial simulated LAI time series may be determined. In some embodiments, the plurality of initial simulated crop growth time series determined in block 714 may include the one or more crop-specific parameters (e.g., LAI, NDVI, etc.), plus one or more additional elements such as weather data.

In some embodiments, the plurality of initial simulated crop growth time series determined in block 714 may be provided en masse as input to the matching algorithm. In some embodiments, the plurality of initial simulated crop growth time series determined in block 714 may be selectively provided (e.g., one initial simulated crop growth time series at a time, responsive to control data) as input to the matching algorithm.

In some embodiments, blocks 708, 710, 712, and 714 may correspond to a first instance of block 504 in FIG. 5 (i.e., determining, for each crop type/sowing date combination within a set of one or more crop types and one or more sowing dates, a simulated crop growth time series for the area of interest using one or more crop growth simulation models and based on historical crop data, geospatial data, and weather data).

The method 700 continues by computing, for each crop type/sowing date combination, a difference between each element of the initial simulated crop growth time series and each corresponding element of the historical crop growth time series (block 716). For example, at the matching algorithm, a difference may be computed between each element of each initial simulated crop growth time series from the crop growth simulator and the historical crop growth time series from the historical crop growth database.

Next, the method 700 continues by computing, for each crop type/sowing date combination, a difference score by summing each difference computed for that crop type/sowing date combination (block 718). For example, at the matching algorithm, a difference score may be computed for each crop type/initial sowing date combination by summing up the computed differences (i.e., the differences computed for the respective elements of the time series).

The method 700 continues by sorting the difference score for each crop type/sowing date combination (block 720). For example, at the matching algorithm, the difference score for each crop type/initial sowing date combination may be sorted.

Next, the method 700 continues by ranking the difference scores to identify a lowest difference score (block 722). For example, at the matching algorithm, the difference score may be ranked to identify the lowest difference score.

The method 700 continues by determining the estimated crop type based on the crop type associated with the lowest difference score (block 724). For example, at the matching algorithm, the time series simulated with the lowest difference score may be taken as the final result with respect to crop type. For example, the matching algorithm may output an estimate of crop type according to this simulation (i.e., the simulation that produced the lowest difference score). In other words, the estimate of crop type output of the matching algorithm may be based on the crop type used by the crop growth simulator to generate the particular simulation that produced the lowest difference score.

In some embodiments, blocks 716, 718, 720, 722, and 724 may correspond to a first instance of block 506 in FIG. 5 (i.e., matching the historical crop growth time series against each instance of the simulated crop growth time series to determine an estimated crop type and/or sowing date).

The method 700 continues by determining, for each crop type/sowing date combination within a set of the estimated crop type and a plurality of sowing dates within the sowing calendar for the estimated crop type, a temporally-shifted simulated crop growth time series with one or more elements including the one or more crop-specific parameters (block 726). For example, at the crop growth simulator, a plurality of temporally-shifted simulated crop growth time series may be determined each with one or more elements including the one or more crop-specific parameters (e.g., LAI, NDVI, etc.), i.e., the same crop-specific parameters as the historical crop growth time series determined in block 706. In some embodiments, the crop growth simulation model of the crop growth simulator determines one simulated crop growth time series for each estimated crop type/sowing date combination. For example, at the crop growth simulator, a simulated LAI time series for each estimated crop type/sowing date combination may be determined using the DS SAT crop growth simulation model, which inherently simulates LAI.

In some embodiments, the plurality of temporally-shifted simulated crop growth time series determined in block 726 may include the one or more crop-specific parameters (e.g., LAI, NDVI, etc.), without any additional elements. For example, a plurality of temporally-shifted simulated LAI time series may be determined. In some embodiments, the plurality of temporally-shifted simulated crop growth time series determined in block 726 may include the one or more crop-specific parameters (e.g., LAI, NDVI, etc.), plus one or more additional elements such as weather data.

In some embodiments, the plurality of temporally-shifted simulated crop growth time series determined in block 726 may be provided en masse as input to the matching algorithm. In some embodiments, the plurality of temporally-shifted simulated crop growth time series determined in block 726 may be selectively provided (e.g., one temporally-shifted simulated crop growth time series at a time, responsive to control data) as input to the matching algorithm.

In some embodiments, block 726 may correspond to a second instance of block 504 in FIG. 5 (i.e., determining, for each crop type/sowing date combination within a set of one or more crop types and one or more sowing dates, a simulated crop growth time series for the area of interest using one or more crop growth simulation models and based on historical crop data, geospatial data, and weather data).

The method 700 continues by computing, for each combination within the set of the estimated crop type and the plurality of sowing dates within the sowing calendar for the estimated crop type, a difference between each element of the time-shifted simulated crop growth time series and each corresponding element of the historical crop growth time series (block 728). For example, at the matching algorithm, a difference may be computed between each element of each time-shifted simulated crop growth time series from the crop growth simulator and the historical crop growth time series from the historical crop growth database.

Next, the method 700 continues by computing, for each combination within the set of the estimated crop type and the plurality of sowing dates within the sowing calendar for the estimated crop type, a difference score by summing each difference computed for that estimated crop type/sowing date combination (block 730). For example, at the matching algorithm, a difference score may be computed for each estimated crop type/sowing date combination by summing up the computed differences (i.e., the differences computed for the respective elements of the time series).

The method 700 continues by sorting the difference score for each crop type/sowing date combination (block 732). For example, at the matching algorithm, the difference score for each estimated crop type/sowing date combination may be sorted.

Next, the method 700 continues by ranking the difference scores to identify a lowest difference score (block 734). For example, at the matching algorithm, the difference score may be ranked to identify the lowest difference score.

The method 700 continues by determining the estimated sowing date of the estimated crop type based on the sowing date associated with the lowest difference score (block 736). For example, at the matching algorithm, the time series simulated with the lowest difference score may be taken as the final result with respect to the sowing date. For example, the matching algorithm may output an estimate of the sowing date according to this simulation (i.e., the simulation that produced the lowest difference score). In other words, the estimate of sowing date output of the matching algorithm may be based on the sowing date used by the crop growth simulator to generate the particular simulation that produced the lowest difference score.

In some embodiments, blocks 728, 730, 732, 734, and 736 may correspond to a second instance of block 506 in FIG. 5 (i.e., matching the historical crop growth time series against each instance of the simulated crop growth time series to determine an estimated crop type and/or sowing date).

Referring now to FIG. 8, a flow chart of an exemplary method 800 of estimating crop type and/or sowing date is depicted in accordance with one or more embodiments. FIG. 8 depicts yet another exemplary implementation of the illustrative method of estimating crop type and/or sowing date shown in FIG. 5, in which the crop type and the sowing date are estimated with respect to a previous crop cycle. The method 800 sets forth the preferred order of the blocks. It must be understood, however, that the various blocks may occur at any time relative to one another.

In some embodiments, when the crop type planted during the previous crop cycle and sowing date are known, the estimation of crop type and sowing date provided by the method 800 may be used to train the crop growth simulator and/or matching algorithm.

The method 800 begins by receiving remote sensor data that include a time series of image data of an area of interest captured during a previous crop cycle (block 802). For example, at a historical crop growth computation unit, a time series of image data of an area of interest captured during a previous crop cycle from a remote sensor database may be received.

The method 800 continues by computing a time series of one or more crop-specific parameters based on the time series of image data (block 804). For example, at the historical crop growth computation unit, a time series of one or more crop-specific parameters (e.g., LAI, NDVI, etc.) based on the time series of image data may be computed. Based on a time series of optical image data of the area of interest, for example, the historical crop growth computation unit may compute a LAI time series according to Equations (1)-(4), above.

Next, the method 800 continues by determining a historical crop growth time series with one or more elements including the one or more crop-specific parameters (block 806). For example, at the historical crop growth computation unit, a historical crop growth time series with one or more elements including the one or more crop-specific parameters (e.g., LAI, NDVI, etc.) may be determined. In some embodiments, the historical crop growth time series determined in block 806 may include the time series computed in block 804, without any additional elements. For example, a historical LAI time series may be determined. In some embodiments, the historical crop growth time series determined in block 806 may include the time series computed in block 804, plus one or more additional elements such as weather data.

In some embodiments, the historical crop growth time series determined in block 806 may be directly provided as input to a matching algorithm. In some embodiments, the historical crop growth time series determined in block 806 may be stored in a historical crop growth database and subsequently provided to the matching algorithm.

In some embodiments, blocks 802, 804, and 806 may correspond to block 502 in FIG. 5 (i.e., providing a historical crop growth time series for an area of interest based on remote sensor data).

The method 800 continues by receiving historical crop data that include crop types historically grown in a crop growth region associated with the area of interest during at least one previous crop cycle and a sowing calendar for each crop type (block 808). For example, at a crop growth simulator, historical crop data that include crop types historically grown in a crop growth region associated with the area of interest during at least one previous crop cycle and a sowing calendar for each of those crop types may be received. In some embodiments, the historical crop data may be received over a network from a crop history database and ingested into a crop growth simulation model of the crop growth simulator via a data source ingest module.

Next, the method 800 continues by receiving geospatial data that include agricultural information characterizing the area of interest (block 810). For example, at the crop growth simulator, geospatial data that include agricultural information characterizing the area of interest may be received. In some embodiments, the geospatial data may be received over a network from a geospatial database and ingested into the crop growth simulation model of the crop growth simulator via the data source ingest module.

The method 800 then continues by receiving weather data that include a previous-crop-cycle weather time series representative of one or more weather conditions in a weather region associated with the area of interest during the previous crop cycle (block 812). For example, at the crop growth simulator, weather data may be received that includes a previous-crop-cycle weather time series representative of one or more weather conditions in a weather region associated with the area of interest during the previous crop cycle (i.e., the same crop cycle during which the image data used in block 802 was captured). The previous-crop-cycle weather time series may, for example, cover the same time period (e.g., March 1 to May 31) and the same periodicity duration (e.g., daily) as the time series of one or more crop-specific parameters computed in block 804. In some embodiments, the weather data may be received over a network from a weather database and ingested into the crop growth simulation model of the crop growth simulator via the data source ingest module.

Next, the method 800 continues by determining, for each crop type/sowing date combination within a set of the crop types historically grown in the crop growth region and a plurality of sowing dates within the sowing calendar for those crop types, a simulated crop growth time series with one or more elements including the one or more crop-specific parameters (block 814). For example, at the crop growth simulator, a plurality of simulated crop growth time series may be determined each with one or more elements including the one or more crop-specific parameters (e.g., LAI, NDVI, etc.), i.e., the same crop-specific parameters as the historical crop growth time series determined in block 806. In some embodiments, the crop growth simulation model of the crop growth simulator determines one simulated crop growth time series for each crop type/sowing date combination. For example, at the crop growth simulator, a simulated LAI time series for each crop type/sowing date combination may be determined using the DS SAT crop growth simulation model, which inherently simulates LAI.

In some embodiments, the plurality of simulated crop growth time series determined in block 814 may be provided en masse as input to the matching algorithm. In some embodiments, the plurality of simulated crop growth time series determined in block 814 may be selectively provided (e.g., one simulated crop growth time series at a time, responsive to control data) as input to the matching algorithm.

In some embodiments, blocks 808, 810, 812, and 814 may correspond to block 504 in FIG. 5 (i.e., determining, for each crop type/sowing date combination within a set of one or more crop types and one or more sowing dates, a simulated crop growth time series for the area of interest using one or more crop growth simulation models and based on historical crop data, geospatial data, and weather data).

The method 800 continues by computing, for each crop type/sowing date combination, a difference score based on one or more differences each computed as a distance between an element of the simulated crop growth time series and a corresponding element of the historical crop growth time series (block 816). For example, at the matching algorithm, a difference may be computed between each element of each simulated crop growth time series from the crop growth simulator and the historical crop growth time series from the historical crop growth database, and a difference score may be computed and stored. The difference score may be computed by summing up the computed differences (i.e., the differences computed for the respective elements in the time series).

Next, the method 800 continues by determining the estimated crop type and sowing date based on the crop type and sowing date associated with the lowest difference score (block 818). For example, at the matching algorithm, the time series simulated with the lowest difference score may be taken as the final result. For example, the matching algorithm may output an estimate of crop type and/or sowing date according to this simulation (i.e., the simulation that produced the lowest difference score). In other words, the estimate of crop type and/or sowing date output of the matching algorithm may be based on the crop type and the sowing date used by the crop growth simulator to generate the particular simulation that produced the lowest difference score. The method 800 may then end.

In some embodiments, blocks 816 and 818 may correspond to block 506 in FIG. 5 (i.e., matching the historical crop growth time series against each instance of the simulated crop growth time series to determine an estimated crop type and/or sowing date).

Referring now to FIG. 9, a block diagram of an example, non-limiting system 900 that facilitates estimation of crop type and/or sowing date is illustrated in accordance with one or more embodiments. Repetitive description of like elements employed in other embodiments described herein is omitted for the sake of brevity. Aspects of systems (e.g., system 900 and the like), apparatuses, or processes explained in this disclosure may constitute machine-executable program module(s) embodied within machine(s), e.g., embodied in one or more computer readable mediums (or media) associated with one or more machines. Such program module(s), when executed by the one or more machines, e.g., one or more computers, one or more computing devices, one or more virtual machines, etc., may cause the one or more machines to perform the operations described.

As shown in FIG. 9, the system 900 may include one or more client systems (e.g., mobile devices) 902, 912, one or more server systems 904, 914, one or more networks 906, one or more crop history databases 920, one or more geospatial databases 922, one or more weather databases 924, one or more remote sensor databases 926, and one or more historical crop growth databases 928. It is to be appreciated that the one or more client systems 902, 912, the one or more server systems 904, 914, the one or more crop history databases 920, the one or more geospatial databases 922, the one or more weather databases 924, the one or more remote sensor databases 926, and the one or more historical crop growth databases 928 may be equipped with communication devices (e.g., one or more communication components 930, described below, with respect to the client system 902) that enable communication between the one or more client systems 902, 912, the one or more server systems 904, 914, the one or more crop history databases 920, the one or more geospatial databases 922, the one or more weather databases 924, the one or more remote sensor databases 926, and the one or more historical crop growth databases 928 over the one or more networks 906.

Client systems 902, 912 may include the functionality described herein with respect to requesting estimation of crop type and/or sowing date and displaying the results of the estimation. One or more client systems 902, 912 may be used to send crop type and sowing date estimate requests to the one or more server systems 904, 914 and to display the results of the estimations returned from the one or more server systems 904, 914. For example, requests for estimation of crop type and/or sowing date may originate from farmers and agribusinesses such as commodity trading, seed supply, pesticide manufacturing, and logistic services, as well as government entities. Client system 912 may be a different type of client system than client system 902. Client system 912 may also be a client system 902 and/or include one or more components of client system 902. It is to be appreciated that in discussions below where more than one client system is employed, the client system may include one or more client systems 902 and/or one or more client systems 912.

Client systems 902, 912 may include, for example, one or more mobile phones (e.g., 1002 in FIG. 10), tablets, PDAs, laptops, or other mobile devices.

Server systems 904, 914 may include the functionality described herein with respect to estimating crop type and/or sowing date (e.g., the method 500 in FIG. 5). Server system 914 may be a different type of client system than server system 904. Server system 914 may also be a server system 904 and/or include one or more components of server system 904. It is to be appreciated that in discussions below where more than one server system is employed, the server systems may include one or more server systems 904 and/or one or more server systems 914.

The various components (e.g., client systems 902, 912, server systems 904, 914, crop history databases 920, geospatial databases 922, weather databases 924, remote sensor databases 926, historical crop growth databases 928, communication components 930, 950, memory 932, 952, processor 938, 958, display 942, keyboard 944, GPS 946, camera 948, and/or other components) of system 900 may be connected directly or via one or more networks 906. Such networks 906 may include wired and wireless networks, including, but not limited to, a cellular network, a wide area network (WAN) (e.g., the Internet), and/or a local area network (LAN), non-limiting examples of which include cellular, WAN, wireless fidelity (Wi-Fi), Wi-Mal, WLAN, radio communication, microwave communication, satellite communication, optical communication, sonic communication, electromagnetic induction communication, quantum communication, and/or any other suitable communication technology.

Client system 902 may include one or more communication components 930 that enable client system 902 to communicate with one or more server systems 904, 914, one or more other client devices 912, one or more crop history databases 920, one or more geospatial databases 922, one or more weather databases 924, one or more remote sensor databases 926, and/or one or more historical crop growth databases 928 over one or more networks 906 via wireless and/or wired communications. For example, the one or more communication components 930 may correspond to network adapter 20 in FIG. 1.

Client system 902 may include or otherwise be associated with at least one memory 932 that may store computer executable program module(s) (e.g., computer executable program module(s) may include, but are not limited to, crop type and sowing date estimate request/display module(s) 934 and associated program module(s)). Crop type and sowing date estimate request/display module(s) 934 may correspond to program modules 42 in FIG. 1. Client system 902 may also include or otherwise be associated with at least one processor 938 that executes the computer executable program module(s) stored in the memory 932. Client system 902 may further include a system bus 940 that may couple the various components including, but not limited to, communication component(s) 930, memory 932, processor 938, display 942, user input device 944, GPS 946, camera 948, and/or other components (e.g., accelerometer, gyroscope, magnetometer).

While the client system 902 is shown in FIG. 9 as including crop type and sowing date estimate request/display module(s) 934, in other embodiments, any number of different types of devices may be associated with or include all or some of the crop type and sowing date estimate request/display module(s) 934. For example, one or more server systems 904, 914 may include all or some of the crop type and sowing date estimate request/display module(s) 934. In other words, data processing associated with requesting estimation of crop type and/or sowing date and displaying the results of the estimation may be performed locally (e.g., using the processor 938) and/or remotely (e.g., at server system 904 using processor 958). All such embodiments are envisaged.

Client system 902 may also include or otherwise be associated with at least one display 942 that may display estimation results, as well as information related to using the crop type and sowing date estimate request/display module (s) 934 (e.g., describing one or more input options by which the area of interest may be input, such as keying in coordinates that define the area of interest, using GPS-derived geolocation data that define the area of interest, and/or using image data that define the area of interest). The display 942 may be any suitable display device. For example, the display 942 may be a display that is integrated into a mobile phone, tablet, PDA, or laptop. In other embodiments, the display 942 may be a component of a device communicatively coupled to a mobile phone, tablet, PDA, or laptop. In some embodiments, the display 942 may be a touch screen that allows a user to interact with the client system 902 using her/his finger or stylus.

Client system 902 may also include or otherwise be associated with at least one user input device 944, such as a keyboard and/or a pointing device (e.g., a graphics tablet, mouse, stylus, pointing stick, trackball, etc.), by which a user may provide input data (e.g., input data defining the area of interest). The user input device 944 may be any suitable user input device. For example, the user input device 944 may be a keyboard and/or a pointing device integrated into a mobile phone, tablet, PDA, or laptop. In other embodiments, the user input device 944 may be a component of a device communicatively coupled to a mobile phone, tablet, PDA, or laptop.

Client system 902 may also include or otherwise be associated with at least one GPS 946 that may provide geolocation data (e.g., geolocation data defining the area of interest). The GPS 946 may be any suitable global satellite-based geolocation system, such as the Global Positioning System (GPS), GLObal Navigation Satellite System (GLO-NASS), Galileo, Quasi-Zenith Satellite System (QZSS), etc. For example, the GPS 946 may be a global satellite-based geolocation system that is integrated into a mobile phone, tablet, PDA, or laptop. In other embodiments, the GPS 946 may be a component of a device communicatively coupled to a mobile phone, tablet, PDA, or laptop.

Client system 902 may also include or otherwise be associated with at least one camera 948 that may capture an image (e.g., an image of a land plat map or other image defining the area of interest). The camera 948 may be any suitable image capture device. For example, the camera 948 may be a camera that is integrated into a mobile phone, tablet, PDA, or laptop. In other embodiments, the camera 948 may be a component of a device communicatively coupled to a mobile phone, tablet, PDA, or laptop.

Server system 904 may include one or more communication components 950 that enable server system 904 to communicate with one or more client systems 902, 912, one or more other server devices 914, one or more crop history databases 920, one or more geospatial databases 922, one or more weather databases 924, one or more remote sensor databases 926, and/or one or more historical crop growth databases 928 over one or more networks 906 via wireless and/or wired communications. For example, the one or more communication components 950 may correspond to network adapter 20 in FIG. 1.

Server system 904 may include or otherwise be associated with at least one memory 952 that may store computer executable program module(s) (e.g., computer executable program module(s) may include, but are not limited to, crop growth simulator module(s) 954, matching algorithm module(s) 956, and associated program module(s)). Crop growth simulator module(s) 954 and match algorithm module(s) 956 may correspond to program modules 42 in FIG. 1, and crop growth simulator 402 and matching algorithm 404, respectively, in FIG. 4. Server system 904 may also include or otherwise be associated with at least one processor 958 that executes the computer executable program module(s) stored in the memory 952. Server system 904 may further include a system bus 960 that may couple the various components including, but not limited to, communication component(s) 950, memory 952, processor 958, and/or other components.

While the server system 904 is shown in FIG. 9 as including crop growth simulator module(s) 954 and matching algorithm module(s) 956, in other embodiments, any number of different types of devices may be associated with or include all or some of the crop growth simulator module (s) 954 and the matching algorithm module(s) 956. For example, one or more client systems 902, 912 may include all or some of the crop growth simulator module(s) 954 and/or matching algorithm module(s) 956. In other words, data processing associated with the crop growth simulator module(s) 954 and/or the matching algorithm module(s) 956 may be performed locally (e.g., using the processor 958) and/or remotely (e.g., at client system 902 using processor 938). All such embodiments are envisaged.

The one or more crop history databases 920 may be any database, non-limiting examples of which include one or more databases that store historical crop data (e.g., crop types historically grown in a crop growth region associated with the area of interest during at least one previous crop cycle and a sowing calendar for each of those crop types). The one or more crop history databases 920 may correspond to the crop history database 420 in FIG. 4.

The one or more geospatial databases 922 may be any database, non-limiting examples of which include one or more databases that store geospatial data (e.g., agricultural information such as elevation, soil moisture, soil type, and other geospatial data characterizing the area of interest). The one or more geospatial databases 922 may correspond to the geospatial database 422 in FIG. 4.

The one or more weather databases 924 may be any database, non-limiting examples of which include one or more databases that store weather (e.g., one or more weather time series representative of one or more weather conditions in a weather region associated with the area of interest). The one or more weather databases 924 may correspond to the weather database 424 in FIG. 4.

The one or more remote sensor databases 926 may be any database, non-limiting examples of which include one or more databases that store remote sensor data (e.g., satellite image data of the area of interest). The one or more remote sensor databases 926 may correspond to the remote sensor database 426 in FIG. 4.

The one or more historical crop growth databases 928 may be any database, non-limiting examples of which include one or more databases that store one or more historical crop growth time series (e.g., a historical crop growth time series of LAI for the current crop cycle or a previous crop cycle) derived from remote sensing. The one or more historical crop growth databases 928 may correspond to the historical crop growth database 406 in FIG. 4.

Figure 10:
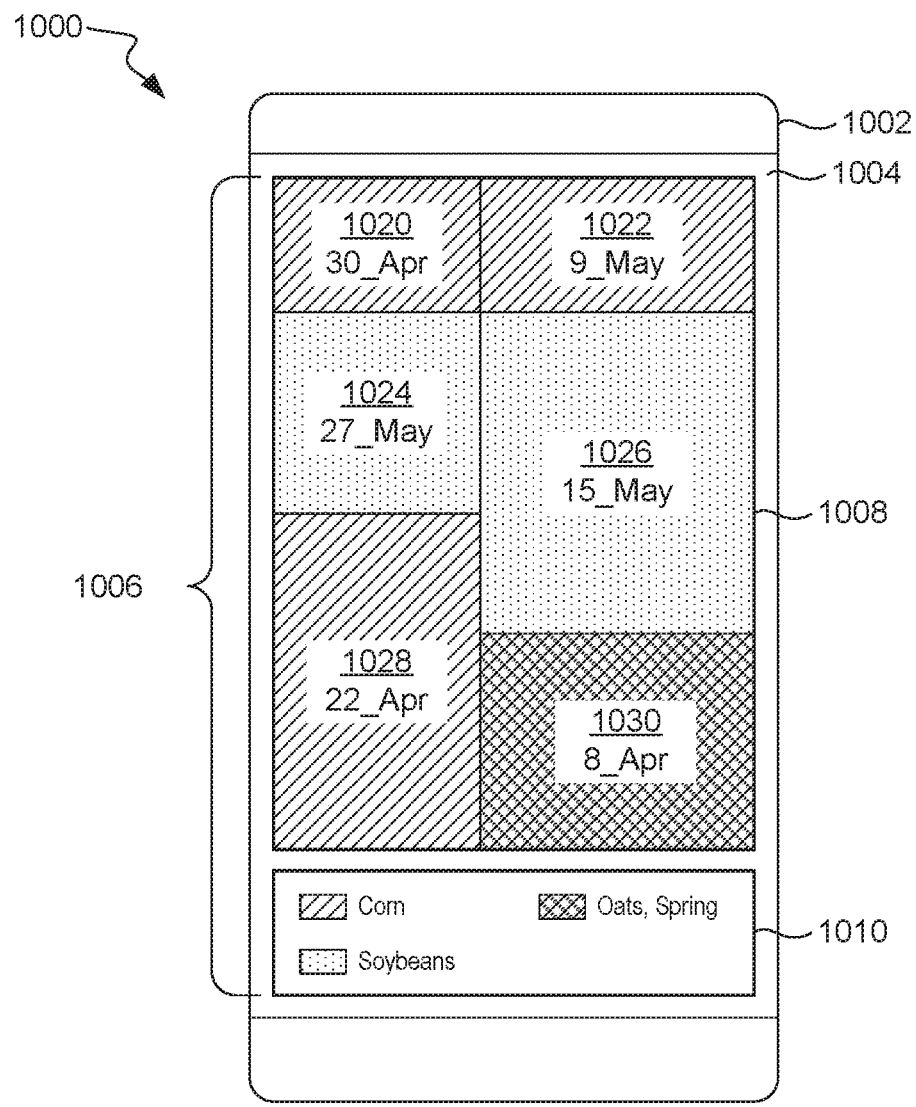
FIG. 10 an exemplary client system for requesting an estimation of crop type and/or sowing date and displaying the results of the estimation, according to one or more embodiments.

Referring now to FIG. 10, depicted is an exemplary client system 1000 for requesting an estimation of crop type and/or sowing date and displaying the results of the estimation in accordance with one or more embodiments. The exemplary client system 100 may correspond to client systems 902, 912 in FIG. 9. The exemplary client system 1000 illustrated in FIG. 10 comprises a mobile phone 1002 with an integrated display/touch screen 1004. In other embodiments, the client system may be a tablet, PDA, laptop, or other client device, including a mobile phone having a different configuration. Displayed on the integrated display/touch screen 1004, in accordance with some embodiments, are results 1006 of an estimation of crop type and sowing date returned by a server system (e.g., 904 in FIG. 9) in response to a request for estimation of crop type and sowing date. The client system 1000 may have earlier sent the request, which may have included GPS-derived geolocation data defining the area of interest, to the client system. For example, the mobile phone 1002 may include an integrated GPS (946 in FIG. 9) and the phone's GPS-derived geolocation data may define the area of interest (e.g., the crop type and sowing date estimate request/display module(s) (934 in FIG. 9) may define that area of interest as the state, county, province, etc. in which the mobile phone 1002 is located).

In the embodiment illustrated in FIG. 10, the results 1006 of an estimation of crop type and sowing date are displayed using a graphical user interface (GUI) that includes one or more windows (e.g., one or more windows, such as a land plot window 1008 and a key window 1010), icons, and/or buttons that allow a user to interact with the displayed results. For example, the GUI may allow a user may interact with the displayed results to show the entire area of interest in the land plot window 1008, or a portion of the area of interest (e.g., using a zoom feature). In the embodiment illustrated in FIG. 10, the land plot window 108 displays at least a portion of the area on interest that includes a plurality of fields 1020, 1022, 1024, 1026, 1028, and 1030, each with an estimated crop type (denoted by the field's fill) and sowing date (labeled using text in each field). Also, in the embodiment illustrated in FIG. 10, the key window 1010 displays a key to the fields' fill graphics. It should be understood that the GUI configuration and functions shown in FIG. 10 are intended to be illustrative only and embodiments of the invention are not limited thereto. For example, the results of an estimation of crop type and sowing date may be displayed using a text-based user interface.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In one or more embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects are described herein with reference to flowchart illustrations and/or block diagrams of methods, apparatus (systems), and computer program products according to one or more embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One skilled in the art will appreciate that many variations are possible within the scope of the present invention. For example, the particular hardware and software implementation details described herein are merely for illustrative purposes and are not meant to limit the scope of the described subject matter. Thus, while the present invention has been particularly shown and described with reference to preferred embodiments thereof, it will be understood by those skilled in the art that changes in form and details may be made therein without departing from the spirit and scope of the present invention.

What is claimed is:

1. A method of estimating crop type and/or sowing date, the method comprising:
   providing a historical crop growth time series for an area of interest based on remote sensor data, wherein the remote sensor data include a time series of image data of the area of interest, and wherein the historical crop growth time series includes one or more elements including one or more crop-specific parameters; wherein the historical crop data include crop types historically grown in a crop growth region associated with the area of interest during at least one previous crop cycle and a sowing calendar for each of those crop types;
   determining, for each crop type/sowing date combination within a set of one or more crop types and one or more sowing dates, a simulated crop growth time series for the area of interest using a crop growth simulation model and based on historical crop data, geospatial data, and weather data, wherein the geospatial data include agricultural information characterizing the area of interest, wherein the weather data include a weather time series representative of one or more weather conditions in a weather region associated with the area of interest, and wherein the simulated crop growth time series includes one or more elements including the one or more crop-specific parameters;
   determining, for each crop type/sowing date combination within a set of one or more crop types and one or more sowing dates, a simulated crop growth time series includes:
      determining an initial simulated crop growth time series for each crop type/sowing date combination within a set of the crop types historically grown in the crop growth region and an initial sowing date within the sowing calendar for each of those crop types; and
   matching the historical crop growth time series against each instance of the simulated crop growth time series to determine an estimated crop type and/or sowing date.

2. The method as recited in claim 1, wherein matching the historical crop growth time series against each instance of the simulated crop growth time series to determine an estimated crop type and/or sowing date includes:

computing, for each crop type/sowing date combination within the set of crop types historically grown in the crop growth region and the initial sowing date within the sowing date calendar for each of those crop types, a difference between each element of the one or more elements of the initial simulated crop growth time series and each corresponding element of the one or more elements of the historical crop growth time series;

computing, for each crop type/sowing date combination within the set of crop types historically grown in the crop growth region and the initial sowing date within the sowing date calendar for each of those crop types, a difference score by summing each difference computed for that crop type/sowing date combination;

storing the difference score computed for each crop type/sowing date combination within the set of crop types historically grown in the crop growth region and the initial sowing date within the sowing date calendar for each of those crop types;

ranking the stored difference scores to identify a lowest difference score;

determining the estimated crop type based on the crop associated with the lowest difference score.

3. The method as recited in claim 2, wherein determining, for each crop type/sowing date combination within a set of one or more crop types and one or more sowing dates, a simulated crop growth time series further includes:

determining a temporally-shifted simulated crop growth time series for each crop type/sowing date combination within a set of the estimated crop type and a plurality of sowing dates within the sowing calendar for the estimated crop type.

4. The method as recited in claim 3, wherein matching the historical crop growth time series against each instance of the simulated crop growth time series to determine an estimated crop type and/or sowing date further includes:

computing, for each crop type/sowing date combination within the set of the estimated crop type and the plurality of sowing dates within the sowing calendar for the estimated crop type, a difference between each element of the one or more elements of the temporally-shifted simulated crop growth time series and each corresponding element of the one or more elements of the historical crop growth time series;

computing, for each crop type/sowing date combination within the set of the estimated crop type and the plurality of sowing dates within the sowing calendar for the estimated crop type, a difference score by summing each difference computed for that crop type/sowing date combination;

storing the difference score computed for each crop type/sowing date combination within the set of the estimated crop type and the plurality of sowing dates within the sowing calendar for the estimated crop type;

ranking the stored difference scores to identify a lowest difference score;

determining the estimated sowing date based on the sowing date associated with the lowest difference score.

5. The method as recited in claim 1, wherein the one or more crop-specific parameters is/are selected from the group consisting of leaf area index (LAI) and normalized difference vegetation index (NDVI).

6. The method as recited in claim 1, wherein the one or more crop-specific parameters include(s) leaf area index (LAI).

7. The method as recited in claim 1, wherein the agricultural information is/are selected from the group consisting of elevation, soil moisture, and soil type.

8. The method as recited in claim 1, wherein the image data is captured by a satellite, an aerial drone, and/or an aircraft.

9. The method as recited in claim 1, wherein the image data is captured by a satellite.

10. A system for estimating crop type and/or sowing date, comprising:

a server device, wherein the server device comprises one or more processors, one or more computer readable storage devices, and program instructions stored on at least one of the one or more computer readable storage devices for execution by at least one of the one or more processors, the program instructions executable to:

provide a historical crop growth time series for an area of interest based on remote sensor data, wherein the remote sensor data include a time series of image data of the area of interest, and wherein the historical crop growth time series includes one or more elements including one or more crop-specific parameters; wherein the historical crop data include crop types historically grown in a crop growth region associated with the area of interest during at least one previous crop cycle and a sowing calendar for each of those crop types;

determine, for each crop type/sowing date combination within a set of one or more crop types and one or more sowing dates, a simulated crop growth time series for the area of interest using a crop growth simulation model and based on historical crop data, geospatial data, and weather data, wherein the geospatial data include agricultural information characterizing the area of interest, wherein the weather data include a weather time series representative of one or more weather conditions in a weather region associated with the area of interest, and wherein the simulated crop growth time series includes one or more elements including the one or more crop-specific parameters;

determine, for each crop type/sowing date combination within a set of one or more crop types and one or more sowing dates, a simulated crop growth time series includes:

determine an initial simulated crop growth time series for each crop type/sowing date combination within a set of the crop types historically grown in the crop growth region and an initial sowing date within the sowing calendar for each of those crop types, match the historical crop growth time series against each instance of the simulated crop growth time series to determine an estimated crop type and/or sowing date.

11. The system as recited in claim 10, wherein to match the historical crop growth time series against each instance of the simulated crop growth time series to determine an estimated crop type and/or sowing date, the program instruction further executable to:

compute, for each crop type/sowing date combination within the set of crop types historically grown in the crop growth region and the initial sowing date within the sowing date calendar for each of those crop types, a difference between each element of the one or more elements of the initial simulated crop growth time series and each corresponding element of the one or more elements of the historical crop growth time series;

compute, for each crop type/sowing date combination within the set of crop types historically grown in the crop growth region and the initial sowing date within the sowing date calendar for each of those crop types, a difference score by summing each difference computed for that crop type/sowing date combination;

store the difference score computed for each crop type/sowing date combination within the set of crop types historically grown in the crop growth region and the initial sowing date within the sowing date calendar for each of those crop types;

rank the stored difference scores to identify a lowest difference score;

determine the estimated crop type based on the crop associated with the lowest difference score.

12. The system as recited in claim 11, wherein to determine, for each crop type/sowing date combination within a set of one or more crop types and one or more sowing dates, a simulated crop growth time series, the program instructions further executable to:

determine a temporally-shifted simulated crop growth time series for each crop type/sowing date combination within a set of the estimated crop type and a plurality of sowing dates within the sowing calendar for the estimated crop type.

13. The system as recited in claim 12, wherein to match the historical crop growth time series against each instance of the simulated crop growth time series to determine an estimated crop type and/or sowing date, the program instructions further executable to:

compute, for each crop type/sowing date combination within the set of the estimated crop type and the plurality of sowing dates within the sowing calendar for the estimated crop type, a difference between each element of the one or more elements of the temporally-shifted simulated crop growth time series and each corresponding element of the one or more elements of the historical crop growth time series;

compute, for each crop type/sowing date combination within the set of the estimated crop type and the plurality of sowing dates within the sowing calendar for the estimated crop type, a difference score by summing each difference computed for that crop type/sowing date combination;

store the difference score computed for each crop type/sowing date combination within the set of the estimated crop type and the plurality of sowing dates within the sowing calendar for the estimated crop type;

rank the stored difference scores to identify a lowest difference score;

determine the estimated sowing date based on the sowing date associated with the lowest difference score.

14. A computer program product for estimating crop type and/or sowing date, the computer program product comprising a computer readable storage medium having program code embodied therewith, the program code executable by one or more processors, to perform a method comprising:

providing a historical crop growth time series for an area of interest based on remote sensor data, wherein the remote sensor data include a time series of image data of the area of interest, and wherein the historical crop growth time series includes one or more elements including one or more crop-specific parameters; providing a historical crop growth time series for an area of interest based on remote sensor data, wherein the remote sensor data include a time series of image data of the area of interest, and wherein the historical crop growth time series includes one or more elements including one or more crop-specific parameters; wherein the historical crop data include crop types historically grown in a crop growth region associated with the area of interest during at least one previous crop cycle and a sowing calendar for each of those crop types;

determining, for each crop type/sowing date combination within a set of one or more crop types and one or more sowing dates, a simulated crop growth time series for the area of interest using a crop growth simulation model and based on historical crop data, geospatial data, and weather data, wherein the geospatial data include agricultural information characterizing the area of interest, wherein the weather data include a weather time series representative of one or more weather conditions in a weather region associated with the area of interest, and wherein the simulated crop growth time series includes one or more elements including the one or more crop-specific parameters;

determining, for each crop type/sowing date combination within a set of one or more crop types and one or more sowing dates, a simulated crop growth time series includes:

determining an initial simulated crop growth time series for each crop type/sowing date combination within a set of the crop types historically grown in the crop growth region and an initial sowing date within the sowing calendar for each of those crop types; and matching the historical crop growth time series against each instance of the simulated crop growth time series to determine an estimated crop type and/or sowing date.

15. The computer program product as recited in claim 14, wherein matching the historical crop growth time series against each instance of the simulated crop growth time series to determine an estimated crop type and/or sowing date includes:

computing, for each crop type/sowing date combination within the set of crop types historically grown in the crop growth region and the initial sowing date within the sowing date calendar for each of those crop types, a difference between each element of the one or more elements of the initial simulated crop growth time series and each corresponding element of the one or more elements of the historical crop growth time series;

computing, for each crop type/sowing date combination within the set of crop types historically grown in the crop growth region and the initial sowing date within the sowing date calendar for each of those crop types, a difference score by summing each difference computed for that crop type/sowing date combination;

storing the difference score computed for each crop type/sowing date combination within the set of crop types historically grown in the crop growth region and the initial sowing date within the sowing date calendar for each of those crop types;

ranking the stored difference scores to identify a lowest difference score;

determining the estimated crop type based on the crop associated with the lowest difference score.

16. The computer program product as recited in claim 15, wherein determining, for each crop type/sowing date combination within a set of one or more crop types and one or more sowing dates, a simulated crop growth time series further includes:

determining a temporally-shifted simulated crop growth time series for each crop type/sowing date combination within a set of the estimated crop type and a plurality of sowing dates within the sowing calendar for the estimated crop type.

17. The computer program product as recited in claim 16, wherein matching the historical crop growth time series against each instance of the simulated crop growth time series to determine an estimated crop type and/or sowing date further includes:

- computing, for each crop type/sowing date combination within the set of the estimated crop type and the plurality of sowing dates within the sowing calendar for the estimated crop type, a difference between each element of the one or more elements of the temporally-shifted simulated crop growth time series and each corresponding element of the one or more elements of the historical crop growth time series;
- computing, for each crop type/sowing date combination within the set of the estimated crop type and the plurality of sowing dates within the sowing calendar for the estimated crop type, a difference score by summing each difference computed for that crop type/sowing date combination;
- storing the difference score computed for each crop type/sowing date combination within the set of the estimated crop type and the plurality of sowing dates within the sowing calendar for the estimated crop type;
- ranking the stored difference scores to identify a lowest difference score;
- determining the estimated sowing date based on the sowing date associated with the lowest difference score.

18. A method of estimating crop type and sowing date, the method comprising:

- receiving remote sensor data including a time series of image data of an area of interest captured during a current crop cycle;
- computing a time series of one or more crop-specific parameters based on the time series of image data;
- determining a historical crop growth time series for the area of interest during the current crop cycle with one or more elements including the one or more crop-specific parameters;
- receiving historical crop data including a plurality of crop types grown in a crop growth region associated with the area of interest during at least one previous crop cycle and a sowing calendar for each of the plurality of crop types;
- receiving geospatial data including agricultural information characterizing the area of interest;
- receiving weather data including a current-crop-cycle weather time series representative of one or more weather conditions in a weather region associated with the area of interest during the current crop cycle;
- determining, for each crop type/sowing date combination within a set of the plurality of crop types and a plurality of sowing dates within the sowing calendar for those crop types, a simulated crop growth time series for the area of interest during the current crop cycle using a crop growth simulation model and based on the historical crop data, the geospatial data, and the weather data, wherein the simulated crop growth time series includes one or more elements including of the one or more crop-specific parameters;
- computing, for each crop type/sowing date combination within the set of the plurality of crop types and the plurality of sowing dates within the sowing calendar for those crop types, a difference score based on one or more differences each computed as a distance between an element of the one or more elements of the simulated crop growth time series and a corresponding element of the one or more elements of the historical crop growth time series;
- determining an estimated crop type and sowing date based on the crop and sowing date associated with the simulated crop growth time series that produces the lowest difference score.

19. A system for estimating crop type and sowing date, comprising:

- a server device, wherein the server device comprises one or more processors, one or more computer readable storage devices, and program instructions stored on at least one of the one or more computer readable storage devices for execution by at least one of the one or more processors, the program instructions executable to:
- receive remote sensor data including a time series of image data of an area of interest captured during a current crop cycle;
- compute a time series of one or more crop-specific parameters based on the time series of image data;
- determine a historical crop growth time series for the area of interest during the current crop cycle with one or more elements including the one or more crop-specific parameters;
- receive historical crop data including a plurality of crop types grown in a crop growth region associated with the area of interest during at least one previous crop cycle and a sowing calendar for each of the plurality of crop types;
- receive geospatial data including agricultural information characterizing the area of interest;
- receive weather data including a current-crop-cycle weather time series representative of one or more weather conditions in a weather region associated with the area of interest during the current crop cycle;
- determine, for each crop type/sowing date combination within a set of the plurality of crop types and a plurality of sowing dates within the sowing calendar for those crop types, a simulated crop growth time series for the area of interest during the current crop cycle using a crop growth simulation model and based on the historical crop data, the geospatial data, and the weather data, wherein the simulated crop growth time series includes one or more elements including the one or more crop-specific parameters;
- compute, for each crop type/sowing date combination within the set of the plurality of crop types and the plurality of sowing dates within the sowing calendar for those crop types, a difference score based on one or more differences each computed as a distance between an element of the one or more elements of the simulated crop growth time series and a corresponding element of the one or more elements of the historical crop growth time series;
- determine an estimated crop type and sowing date based on the crop and sowing date associated with the simulated crop growth time series that produces the lowest difference score.

* * * * *